(12) United States Patent
Yano

(10) Patent No.: US 12,323,182 B2
(45) Date of Patent: Jun. 3, 2025

(54) PROCESSING DEVICE, PROCESSING METHOD, AND RECORDING MEDIUM

(71) Applicant: NEC Corporation, Tokyo (JP)

(72) Inventor: Yutaka Yano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 391 days.

(21) Appl. No.: 17/795,961

(22) PCT Filed: Dec. 28, 2020

(86) PCT No.: PCT/JP2020/049077
§ 371 (c)(1),
(2) Date: Jul. 28, 2022

(87) PCT Pub. No.: WO2021/153143
PCT Pub. Date: Aug. 5, 2021

(65) Prior Publication Data
US 2023/0075118 A1 Mar. 9, 2023

(30) Foreign Application Priority Data
Jan. 30, 2020 (JP) .................................. 2020-013946

(51) Int. Cl.
*H04B 10/071* (2013.01)
*G01M 11/00* (2006.01)

(52) U.S. Cl.
CPC ....... *H04B 10/071* (2013.01); *G01M 11/3109* (2013.01)

(58) Field of Classification Search
CPC . H04B 10/071; H04B 10/85; G01M 11/3109; G01K 11/32; G01L 11/025; G01D 5/353
See application file for complete search history.

(56) References Cited

U.S. PATENT DOCUMENTS

| 5,023,445 A * | 6/1991 | Goll ..................... H04B 10/697 356/73.1 |
| 8,174,627 B2 * | 5/2012 | Taft ........................ H04N 9/312 348/746 |

(Continued)

FOREIGN PATENT DOCUMENTS

| GB | 2126820 A | 3/1984 |
| JP | S61-500180 A | 1/1986 |

(Continued)

OTHER PUBLICATIONS

Bernard et al; "Events detection and recognition by the fiber vibration system based on power spectrum estimation"; 2018; Advances in Mechanical Engineering; 2018, vol. 10(11) 1-9 The Author(s) 2018; DOI: 10.1177/1687814018808679 (Year: 2018).*

(Continued)

*Primary Examiner* — Mohammed Waliullah
(74) *Attorney, Agent, or Firm* — Sughrue Mion, PLLC

(57) ABSTRACT

A processing device disposed inside a transmitter/receiver intended for use in optical fiber sensing using an optical fiber in order to enable restricting utilization of a prescribed range of acquired data, the processing device comprising: a mask unit which masks a prescribed range of acquired data, which is the data acquired by the transmitter/receiver through the optical fiber sensing; and an output unit which outputs post-masking data, which is the data that has undergone the aforementioned masking, to the outside of the transmitter/receiver, wherein the acquired data prior having the masking performed thereon for the prescribed range is not outputted to the outside.

18 Claims, 19 Drawing Sheets

(56) References Cited

U.S. PATENT DOCUMENTS

| | | | |
|---|---|---|---|
| 9,469,247 B2* | 10/2016 | Juneja | B60Q 9/00 |
| 10,466,172 B2 | 11/2019 | Yaman et al. | |
| 2016/0252651 A1 | 9/2016 | Ellmauthaler et al. | |
| 2018/0283169 A1 | 10/2018 | Oguche et al. | |
| 2018/0342156 A1* | 11/2018 | Martin | G08G 1/052 |
| 2021/0242957 A1* | 8/2021 | Tanizawa | H04B 10/40 |

FOREIGN PATENT DOCUMENTS

| | | | |
|---|---|---|---|
| JP | 2004012280 A * | 1/2004 | |
| JP | 3722653 B2 | 11/2005 | |
| JP | 3743403 B2 | 2/2006 | |
| JP | 4143969 B2 | 9/2008 | |
| JP | 4402998 B2 | 1/2010 | |
| JP | 4566474 B2 | 10/2010 | |
| JP | 4573158 B2 | 11/2010 | |
| JP | 2012-023573 A | 2/2012 | |
| JP | 2014-206405 A | 10/2014 | |
| JP | 2019-522197 A | 8/2019 | |
| WO | 2019/072899 A2 | 4/2019 | |

OTHER PUBLICATIONS

JP Office Action for JP Application No. 2021-574561, mailed on Jun. 6, 2023 with English Translation.

International Search Report for PCT Application No. PCT/JP2020/049077, mailed on Mar. 2, 2021.

English translation of Written opinion for PCT Application No. PCT/JP2020/049077, mailed on Mar. 2, 2021.

R. Posey Jr et al., "Strain sensing based on coherent Rayleigh scattering in an optical fibre", Electronics Letters, Sep. 28, 2000, vol. 36, No. 20.

Jiro Makino (ed), "Digital Signature Guidebook (second edition)", Certification Authority Conference, Sep. 2013 [searched on Jan. 8, 2020, Internet (http://www.c-a-c.jp/download/guidebook.html)].

G. Marra et al., "Ultrastable laser interferometry for earthquake detection with terrestrial and submarine cables". Science, Aug. 3, 2018, vol. 361, Issue 6401, pp. 486-490.

* cited by examiner

Fig.3

RAW DATA 901

| | | j-2 | j-1 | j | j+1 | j+2 | |
|---|---|---|---|---|---|---|---|
| 2019-07-15_14:51:34.000 | 617 | 622 | 739 | 609 | 1237 | 880 | ... |
| 2019-07-15_14:51:34.010 | 2333 | 3686 | 7165 | 5993 | 5696 | 5232 | ... |
| 2019-07-15_14:51:34.020 | 9169 | 8830 | 6732 | 4468 | 4158 | 10615 | ... |
| 2019-07-15_14:51:34.030 | 3579 | 3630 | 5020 | 4689 | 5374 | 13866 | ... |
| 2019-07-15_14:51:34.040 | 15855 | 7555 | 13379 | 14326 | 13896 | 13111 | ... |
| 2019-07-15_14:51:34.050 | 12922 | 7344 | 7688 | 7061 | 6782 | 6113 | ... |
| 2019-07-15_14:51:34.060 | 4220 | 3476 | 3981 | 5923 | 6751 | 6567 | ... |
| ... | ... | ... | ... | ... | ... | ... | |

Row number (column direction): i-2, i-1, i, i+1, i+2

Column number (row direction): j-2, j-1, j, j+1, j+2

Fig.4

SUMMARY DATA 902

| | | COLUMN NUMBER | | | | | | |
|---|---|---|---|---|---|---|---|---|
| | 1 | | j-2 | j-1 | j | j+1 | j+2 | |
| i-2 | 2019-07-15_14:51:34.000 | 5873 | 6725 | 9777 | 5722 | 5005 | 2999 | ... |
| i-1 | 2019-07-15_14:51:34.500 | 5427 | 3916 | 3553 | 3538 | 2773 | 1795 | ... |
| i | 2019-07-15_14:51:35.000 | 3972 | 4403 | 3867 | 2923 | 2440 | 2539 | ... |
| i+1 | 2019-07-15_14:51:35.500 | 4395 | 5544 | 7685 | 7393 | 8572 | 4183 | ... |
| i+2 | 2019-07-15_14:51:36.000 | 5704 | 4431 | 5459 | 7595 | 8414 | 2693 | ... |
| | 2019-07-15_14:51:36.500 | 3774 | 5067 | 6102 | 6229 | 5179 | 4649 | ... |
| | 2019-07-15_14:51:37.000 | 2730 | 3007 | 3464 | 4843 | 4337 | 3116 | ... |
| | ... | ... | ... | ... | ... | ... | ... | |

ROW NUMBER → COLUMN DIRECTION

ROW DIRECTION →

Fig.5

EVENT DATA 903

| Event ID | Appearing | | | | | | Missing | | | | | |
|---|---|---|---|---|---|---|---|---|---|---|---|---|
| | Date | Time | Cable position (m) | Longitude | Latitude | ... | Date | Time | Cable position (m) | Longitude | Latitude | ... |
| 3923 | 2019/7/15 | 2:16:54 | 59.937 | 140.0921 | 35.1838 | ... | 2019/7/15 | 2:30:54 | 60.680 | 140.0977 | 35.1874 | ... |
| 3924 | 2019/7/15 | 3:27:40 | 8.794 | 139.7068 | 34.9335 | ... | 2019/7/15 | 3:33:40 | 14.719 | 139.7514 | 34.9625 | ... |
| 3925 | 2019/7/15 | 4:52:48 | 84.153 | 140.2745 | 35.3022 | ... | 2019/7/15 | 5:00:48 | 92.336 | 140.3362 | 35.3423 | ... |
| 3926 | 2019/7/15 | 6:22:22 | 81.787 | 140.2567 | 35.2907 | ... | 2019/7/15 | 6:28:22 | 87.816 | 140.3021 | 35.3202 | ... |
| 3927 | 2019/7/15 | 6:43:37 | 70.363 | 140.1706 | 35.2348 | ... | 2019/7/15 | 6:50:37 | 72.489 | 140.1866 | 35.2452 | ... |

Fig.14A  KIND OF MASK PROCESSING: TRANSPARENTIZING
ACQUISITION OF BACKGROUND SAMPLE DATA
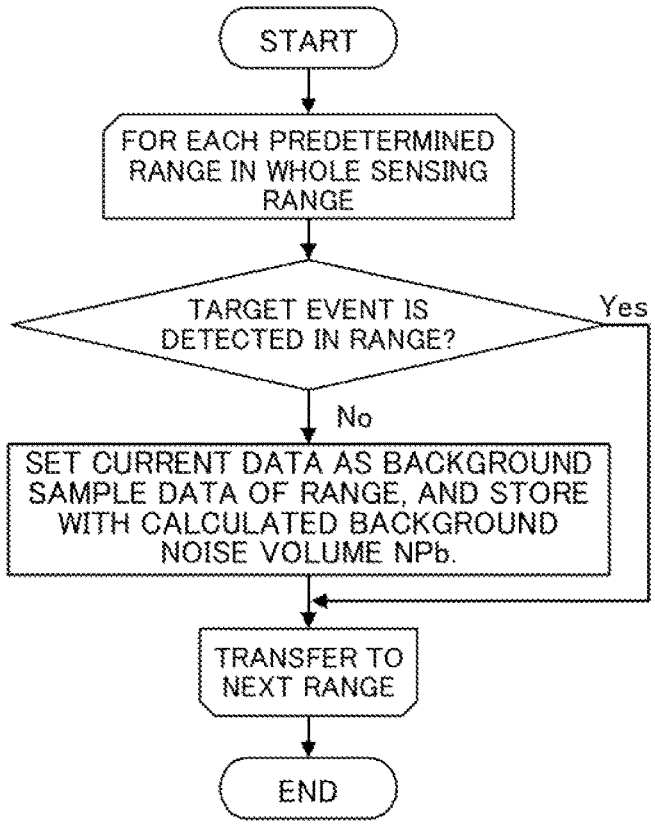
Fig.14B  TRANSPARENTIZING
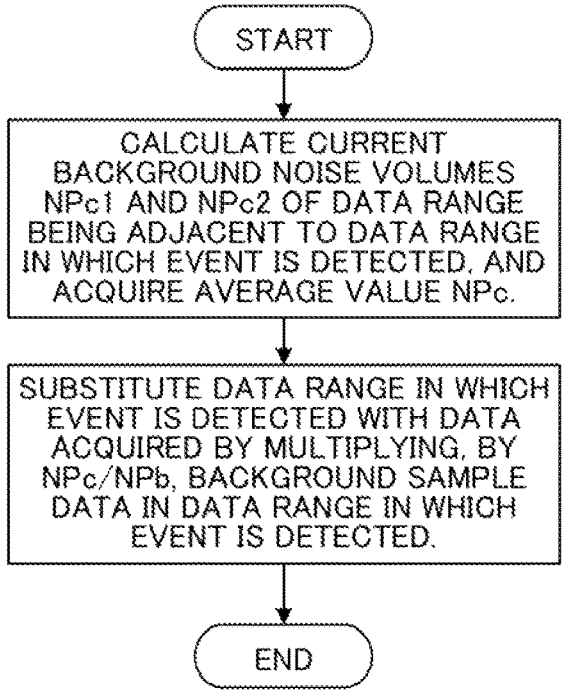

PROCESSING DEVICE, PROCESSING METHOD, AND RECORDING MEDIUM

This application is a National Stage Entry of PCT/JP2020/049077 filed on Dec. 28, 2020, which claims priority from Japanese Patent Application 2020-013946 filed on Jan. 30, 2020, the contents of all of which are incorporated herein by reference, in their entirety.

TECHNICAL FIELD

The present invention relates to optical fiber sensing.

BACKGROUND ART

Distributed optical fiber sensing is a well-known technique of utilizing an installed optical fiber as a distributed sensing element for acquiring environmental information representing an environment of the optical fiber.

Typically, environmental information is information representing presence of vibration including a sound. In the present description, it is assumed that a sound is included in vibration. In addition, environmental information includes environmental temperature, pressure, and the like. Hereinafter, in consideration of ease of understanding, a case where environmental information is mainly information representing presence of vibration will be described.

For example, in optical fiber sensing, coherent light is incident on a sensing optical fiber, return light from each part of the sensing optical fiber is detected and analyzed, and disturbance (dynamic strain) acting on the sensing optical fiber is acquired as the environmental information. Such disturbance is typically vibration of a sensing optical fiber being caused by an acoustic wave or the like transmitted to a part of the sensing optical fiber. When information representing presence of such vibration in at least a part of the sensing optical fiber is acquired as the environmental information, the optical fiber sensing is referred to as distributed acoustic sensing (DAS).

A principle of DAS is disclosed in, for example, PTL 1 and NPL 1. DAS is one kind of OTDR-type sensing method. Herein, OTDR is an abbreviation of optical time-domain reflectometry.

FIGS. 1A and 1B are explanatory diagrams of an operation of a general OTDR-type optical fiber sensing system. FIG. 1A is an explanatory diagram of a main configuration of a sensing system. FIG. 1B is an image diagram illustrating aspects of probe light and backscattered light thereof in the sensing system.

As represented in FIG. 1A, the OTDR-type optical fiber sensing system includes an interrogator 100 and an optical fiber 200. The interrogator 100 delivers probe light 900 to the optical fiber 200 being a sensing optical fiber. The probe light 900 moves rightward in the optical fiber 200, and generates backscattered light such as each piece of backscattered light 801 and 802 at each position on the optical fiber 200 in a process of the movement. The backscattered light is typically Rayleigh backscattered light. The backscattered light moves leftward in the optical fiber 200 toward the interrogator 100, and is brought into the interrogator 100. The backscattered light generated at each position on the optical fiber 200 is influenced by an environment at the position. The environment is, for example, a temperature at the position or presence of vibration such as a sound.

The interrogator 100 detects a degree of an influence on return light of backscattered light at each cable distance of the optical fiber 200.

Then, the interrogator 100 derives, from information detected from the return light, environmental information relating to an environment at each cable distance of the optical fiber 200. The environmental information is, for example, information representing vibration status of an optical cable.

It is known that, when DAS being one kind of OTDR-type optical fiber sensing system is used, environmental information every several meters can be acquired in a laying range of an optical fiber over a section being equal to or more than 40 km. Thus, when DAS is applied by utilizing a cable laid on land or undersea, a wide range of environmental information can be acquired.

FIG. 2 is a conceptual diagram illustrating a configuration example of a DAS system 300 being one kind of OTDR-type optical fiber sensing system illustrated in FIGS. 1A and 1B. The DAS system 300 includes an interrogator 100 and an optical fiber 200.

The optical fiber 200 is a general optical fiber, and is included in a cable such as a submarine cable or a land cable. A general optical fiber generates backscattered light that has been subjected to a change due to an environment such as presence of vibration including a sound. The backscattered light typically results from Rayleigh back scattering. In such a case, the change is mainly a change of a phase (phase change).

The optical fiber 200 may be an optical fiber in which a plurality of optical fibers are connected by an amplification repeater or the like. A cable including the optical fiber 200 may be connected to another optical communication device that performs optical communication via the optical fiber 200 with a non-illustrated optical communication device including the interrogator 100.

The interrogator 100 includes a processing unit 101, a synchronous control unit 109, a light source unit 103, a modulation unit 104, and a detection unit 105. The modulation unit 104 is connected to the optical fiber 200 via an optical fiber 201 and an optical coupler 211, and the detection unit 105 is connected to the optical fiber 200 via the optical coupler 211 and an optical fiber 202.

The light source unit 103 includes a laser light source, and causes continuous laser light to enter the modulation unit 104.

The modulation unit 104 subjects the continuous laser light entering from the light source unit 103 to, for example, amplitude modulation synchronously with a trigger signal from the synchronous control unit 109, and generates probe light of a sensing signal wavelength. The probe light is, for example, in a pulse form. Then, the modulation unit 104 delivers the probe light to the optical fiber 200 via the optical fiber 201 and the optical coupler 211.

The synchronous control unit 109 also delivers a trigger signal to an acquisition processing unit 101a, and informs which of data that are continuously subjected to analog/digital (A/D) conversion and input is a time origin.

When the delivery is performed, return light from each position on the optical fiber 200 reaches the detection unit 105 from the optical coupler 211 via the optical fiber 202. Among return light from each position on the optical fiber, return light from a position closer to the interrogator 100 reaches the interrogator 100 in a shorter time after delivery of probe light is performed. When a certain position on the optical fiber 200 is subjected to an influence of an environment such as presence of a sound, a change from probe light at delivery is caused, by the environment, to backscattered light generated at the position. When backscattered light is Rayleigh backscattered light, the change is mainly a phase change.

Return light to which the phase change is caused is detected by the detection unit 105. While a method of the detection includes well-known synchronous detection and delay detection, either method may be used. For example, delay detection is used in a method disclosed in NPL 1. Since a configuration for performing phase detection is well known, description thereof is omitted herein. An electric signal (detection signal) acquired by detection represents a degree of a phase change by amplitude or the like. The electric signal is input to the processing unit 101.

The processing unit 101 includes the acquisition processing unit 101a, and, in some cases, an identification unit 101c.

The acquisition processing unit 101a first A/D-converts the electric signal into digital data. Next, a phase change, from a previous measurement, of light that has been scattered at each point on the optical fiber 200 and returned is acquired, for example, in a form of a difference from the previous measurement at the same point. Since such signal processing is a general technique of DAS, detailed description is omitted.

The acquisition processing unit 101a derives data in a form similar to that acquired by virtually linking dotted electric sensors together, at each point on the optical fiber 200. The data are virtual sensor array output data acquired as a result of signal processing, but are hereinafter referred to as RAW data for simplification of description.

The acquisition processing unit 101a also generates and outputs summary data (also conventionally referred to as waterfall data) summarizing RAW data in such a way that the RAW data can be overlooked.

Next, the identification unit 101c identifies an event by, for example, calculating a similarity to patterns of a plurality of events held in advance, from information such as summary data or RAW data. Then, the identification unit 101c outputs data listing the event.

Events expected to be automatically identified by the identification unit 101c are wide-ranging according to purposes thereof. On land, the events are, for example, an earthquake, a running sound of an automobile or a train, a collision sound, a gunshot sound, a shout of a person, and the like. Undersea, the events are, for example, an earthquake, a tsunami, a sailing sound of a ship, a cry of marine life (a whale, a dolphin, or the like), a traveling sound of an otter trawl fishing gear on the seabed, a sound when a heavy object is dropped and reaches the seabed, and the like.

While event data being output by the identification unit 101c vary according to a purpose, for example, passage vibration of an automobile is detected, and a time, a place, a movement direction, a movement speed, and the like of occurrence of the passage vibration are output as event data.

The acquisition processing unit 101a and the identification unit 101c output acquired data to an external output unit 106 or store acquired data in an external storage unit 102, via an output I/F 107. Herein, I/F is an abbreviation of interface.

The processing unit 101 and the synchronous control unit 109 are, for example, central processing units of a computer, and in such a case, are operated by software including a program and information. A program and information necessary for operations to be performed by the processing unit 101 and the synchronous control unit 109 are held in advance in non-illustrated memories or the like (memories or storage units) inside the processing unit 101 and the synchronous control unit 109. Further, the processing unit 101 and the synchronous control unit 109 are capable of storing predetermined information in the non-illustrated memories or the like inside the processing unit 101 and the synchronous control unit 109. The processing unit 101 and the synchronous control unit 109 are also capable of reading information stored in the memories or the like.

FIG. 3 is an image diagram illustrating RAW data 901 being an example of RAW data. The example of FIG. 3 is two-dimensional array data constituted of a matrix. A column number is relevant to a position on an optical fiber to be sensed. The position is set, for example, at an equal interval. However, a data extraction time (time stamp) is stored in the first column.

Meanwhile, a row number represents an elapsed time. The example of FIG. 3 is 100 Hz sampling, i.e., data are extracted every 0.01 second and recorded.

Each numerical value identified by a combination of a row number and a column number except for column number 1 is a sensor output value representing a degree of environmental information. The value is hereinafter referred to as a sensing output value. The sensing output value is an output value of each sensor when sensors (sensor array) linked together on an optical fiber are virtually assumed. The acquisition processing unit 101a subjects return light to arithmetic processing, and calculates data being typically in a form of an output from such a virtual sensor array.

In typical DAS, a position on a sensing optical fiber is set every 10 meters, and the number of pieces of data in a position direction is about 10000.

FIG. 4 is an image diagram illustrating summary data 902 being an example of summary data. Although a data storage format is similar to that of the RAW data 901 in FIG. 3, a distance, on an optical fiber to be sensed, represented by an interval of a column number is increased 10 times, and an interval of an elapsed time represented by an interval of a row number is increased 50 times. A value of one piece of summary data identified by a combination of a row number and a column number is one representative value derived from 10 pieces of RAW data in a fiber distance direction and 50 pieces of RAW data in a time axis direction, i.e., 500 pieces of RAW data. Thus, a data size of the summary data 902 is significantly reduced compared to the RAW data 901. A method of acquiring a representative value is, for example, derivation of an average or a maximum value.

FIG. 5 is an image diagram illustrating event data 903 being an example of event data. The event data 903 represent a log of an event automatically identified by the identification unit 101c. FIG. 5 is an example in which a vessel sailing near a submarine cable is automatically identified. In this example, an event from a point where the vessel has come near and become recognizable to a point where the vessel has gone far and become unrecognizable is treated as one piece of event data. A time and a place at which the vessel has started to be recognized, and a time and a place at which the vessel has become unrecognizable, are recorded as attached information of the event. Such an event is sequentially recorded at every occurrence.

Although an example of an event file in FIG. 5 is an example that describes only a detection event of a vessel, events automatically identified by the identification unit 101c as described above range widely according to purposes thereof. Thus, a plurality of event kinds are output to an event file.

Hereinafter, data including at least one of RAW data, summary data, and event data are referred to as acquisition data.

FIG. 6 is a conceptual diagram illustrating a processing flow example of acquisition processing of environmental information being performed by the processing unit 101 illustrated in FIG. 2.

The processing unit 101 starts processing illustrated in FIG. 6 by, for example, an input of start information from outside.

When processing is started, the processing unit 101 first derives the above-described RAW data from current and past detection signals, as processing in S101. Herein, the detection signal is an output from the detection unit 105 in FIG. 2. The processing in S101 is typically performed by the acquisition processing unit 101a.

Next, as processing in S102, the processing unit 101 derives the above-described summary data from the RAW data derived by the processing in S101. The processing in S102 is performed when summary data are needed. The processing in S102 is typically performed by the acquisition processing unit 101a.

Then, as processing in S103, the processing unit 101 identifies an event from a characteristic pattern or the like included in the derived RAW data and summary data, and derives the above-described event data. The processing in S103 is performed when event data are needed. The processing in S103 is typically performed by the identification unit 101c.

Then, the processing unit 101 ends the processing illustrated in FIG. 6.

The acquired RAW data, summary data, and event data are stored on the external storage unit 102 or image-displayed by the external output unit 106 via the output I/F 107.

In a monitoring camera system, even a video of which output to outside is not desirable may be acquired. In contrast, PTLs 2 to 6 are techniques each disclosing a method of providing, as needed, limitation (masking) that causes a portion in a part of necessary digital video data to be unable to be seen without modification. Further, PTL 7 discloses a method of canceling (decrypting), by only an empowered party, a mask (encryption) given to digital video data.

CITATION LIST

Patent Literature

[PTL 1] GB Patent No. 2126820
[PTL 2] Japanese Patent No. 3722653
[PTL 3] Japanese Patent No. 4566474
[PTL 4] Japanese Patent No. 3743403
[PTL 5] Japanese Patent No. 4143969
[PTL 6] Japanese Patent No. 4573158
[PTL 7] Japanese Patent No. 4402998
[PTL 8] U.S. patent Ser. No. 10/466,172

Non Patent Literature

[NPL 1] R. Posey Jr, G. A. Johnson and S. T. Vohra, "Strain sensing based on coherent Rayleigh scattering in an optical fibre", ELECTRONICS LETTERS, 28 Sep. 2000, Vol. 36, No. 20
[NPL 2] Digital Signature Guidebook (second edition), compiled by Jiro Makino, September 2013, issued by Certification Authority Conference, [searched on Jan. 8, 2020], Internet (http://www.c-a-c.jp/download/guidebook.html)
[NPL 3] G. Marra et al., "Ultrastable laser interferometry for earthquake detection with terrestrial and submarine cables", Science 3 Aug. 2018: Vol. 361, Issue 6401, pp. 486 to 490

SUMMARY OF INVENTION

Technical Problem

However, when such a distributed optical fiber sensing technique is used, an optical fiber stretched in a wide range as a communication medium also comes to serve as a distributed sensor element, and this allows a wide range of environmental information to be acquired. Thus, a sensible area (positional range) may also include, for example, an area where a sensing action is regulated by a nation, a municipality, or the like.

An object of the present invention is to provide a sensing system processing device and the like having a function of masking data in a regulated area (an area where acquisition is not desirable) among pieces of acquired data.

Solution to Problem

A processing device according to the present invention is included inside a transmission/reception device to be used for optical fiber sensing by an optical fiber, and includes a mask unit that masks a predetermined range in acquisition data being data acquired by the transmission/reception device through the optical fiber sensing, and an output unit that outputs, to an outside of the transmission/reception device, post-masking data being the data on which the masking has been performed, wherein the acquisition data before the masking regarding the predetermined range is performed are not output to the outside.

Advantageous Effects of Invention

A processing device and the like according to the present invention are capable of limiting utilization of a predetermined range of acquired data as needed.

BRIEF DESCRIPTION OF DRAWINGS

FIG. 3 is a diagram for describing one example of RAW data.

FIG. 4 is a diagram for describing one example of summary data.

FIG. 5 is a diagram for describing one example of event data.

FIG. 14A and FIG. 14B are conceptual diagram-diagrams illustrating an example of mask processing when the kind of mask processing is transparentizing.

EXAMPLE EMBODIMENT

In an example embodiment, a DAS system being a typical example of an OTDR-type optical fiber sensing system is described by way of example.

First Example Embodiment

The present example embodiment is an example embodiment relating to an optical fiber sensing system that masks a predetermined range part of acquisition information. In the following description, it is assumed that "mask" refers to bringing, by removal, encryption, or the like, acquisition information of a target range into a state where the acquisition information may not be utilized.

[Configuration of Interrogator]

Figure 1A:
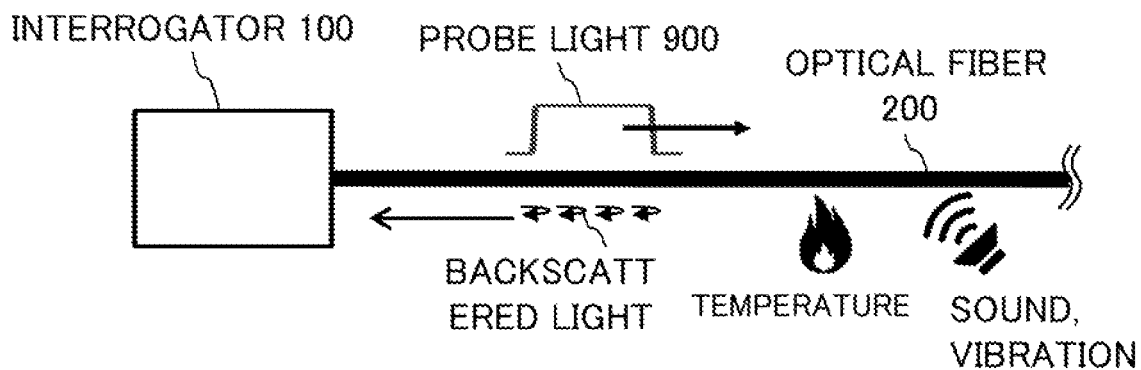
FIGS. 1A and FIG. 1B are explanatory diagrams of an operation of a general OTDR-type optical fiber sensing system.
Figure 1B:
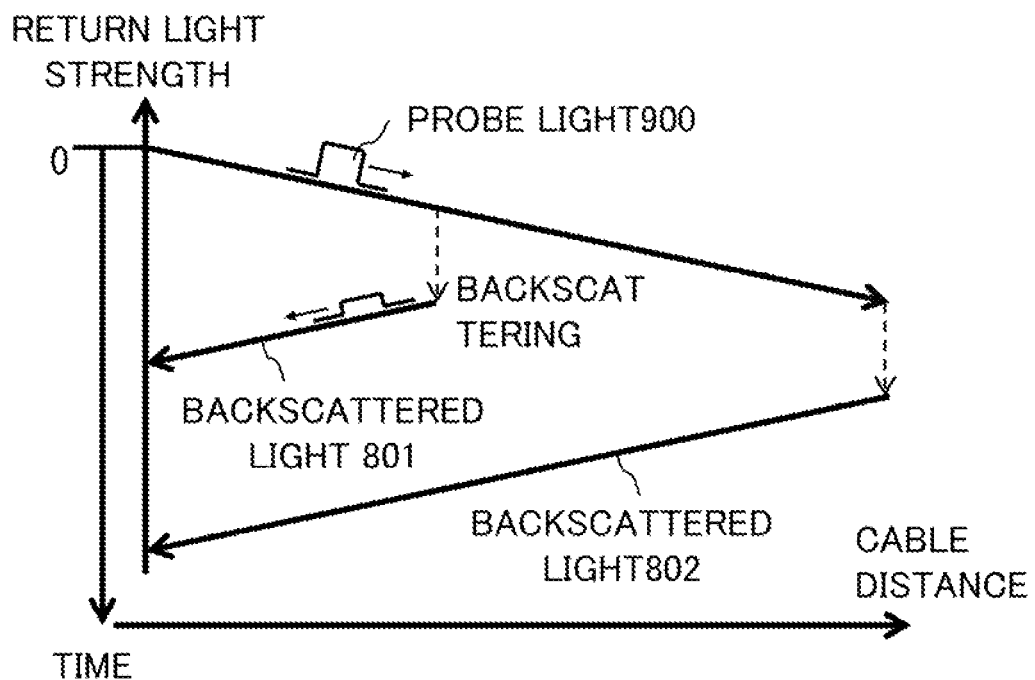
Figure 2:
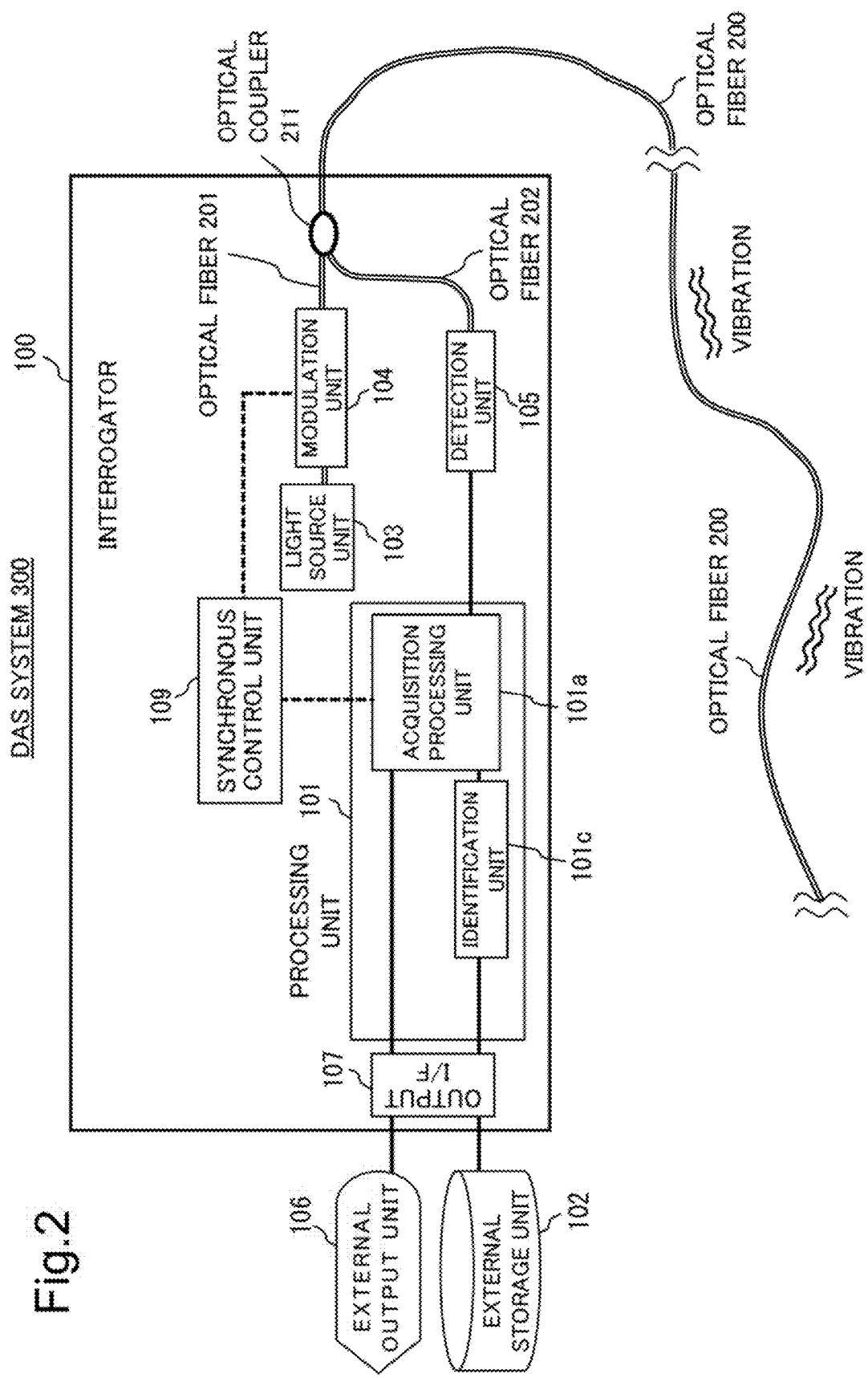
FIG. 2 is a configuration diagram of a general DAS system.
Figure 7:
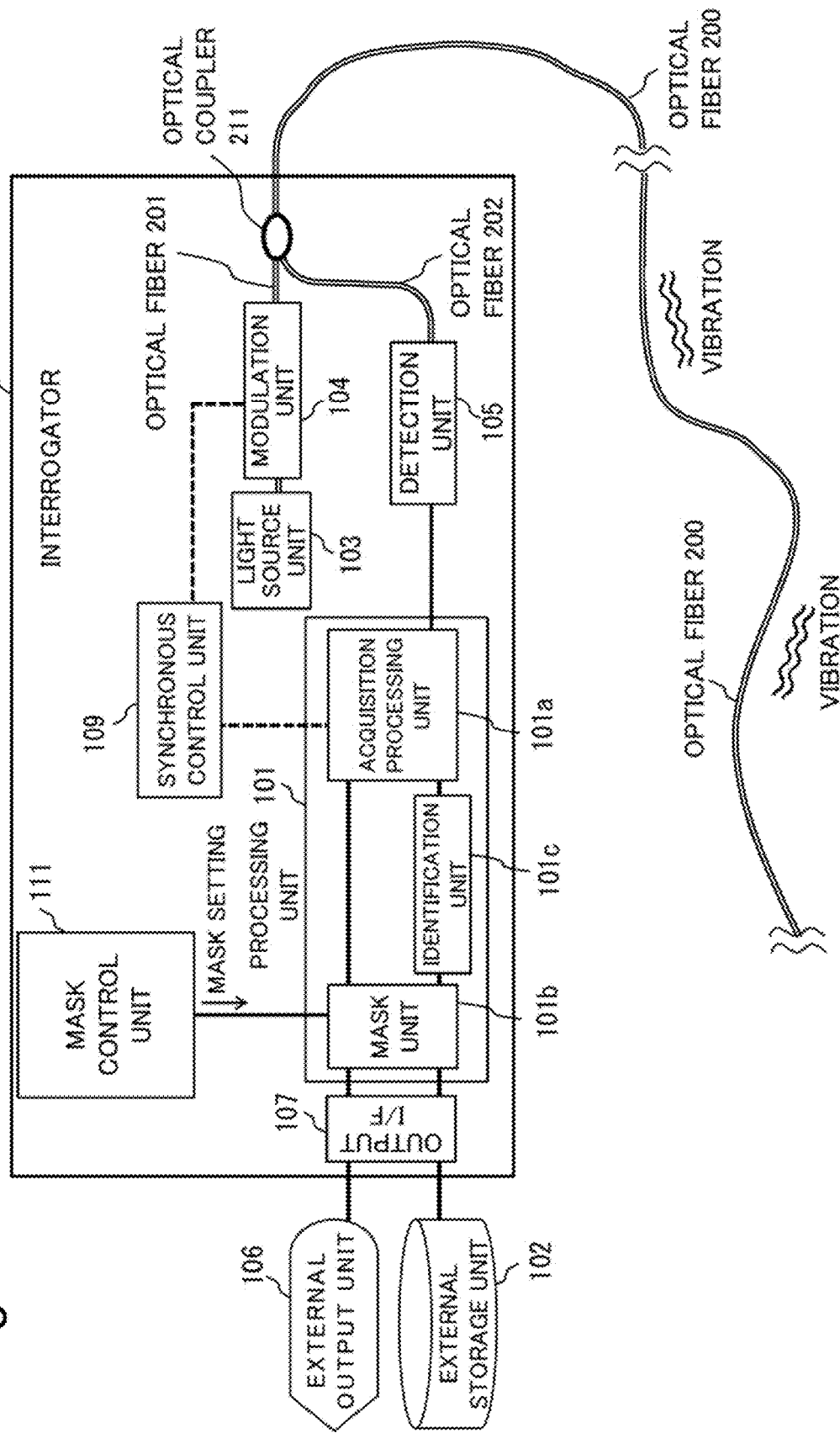
FIG. 7 is a conceptual diagram illustrating a configuration example of a DAS system according to a first example embodiment.

FIG. 7 is a conceptual diagram illustrating a configuration of a DAS system 300 being an example of the optical fiber sensing system according to the present example embodiment. The DAS system 300 illustrated in FIG. 7 is a DAS system in which a mask unit 101b is added to the processing unit 101 of the DAS system 300 illustrated in FIG. 2. The DAS system 300 illustrated in FIG. 7 differs from the DAS system 300 illustrated in FIG. 2 in the following point. A difference between the DAS system 300 illustrated in FIG. 7 and the DAS system 300 illustrated in FIGS. 1A and 1B are mainly described below.

An acquisition processing unit 101a of a processing unit 101 inputs the above-described RAW data and summary data to the mask unit 101b.

An identification unit 101c inputs the above-described event data to the mask unit 101b.

The mask unit 101b masks a part, satisfying a predetermined condition, of acquisition data input from the acquisition processing unit 101a and the identification unit 101c. Herein, acquisition data include at least one of RAW data, summary data, and event data, as described above. Mask condition setting is described later.

The mask unit 101b stores, on an external storage unit 102, acquisition data after masking and processed data thereof (post-masking data). The mask unit 101b outputs the post-masking data to an external output unit 106 as needed. The output is display onto a display unit, or transmission to others, as described above.

Figure 6:
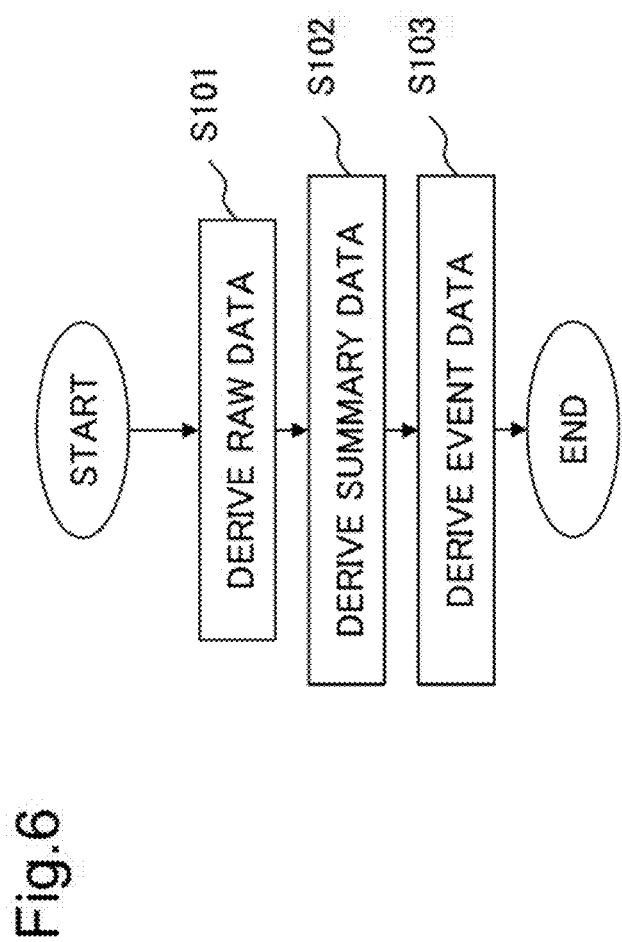
FIG. 6 is a processing flow diagram of a general DAS system.
Figure 8:
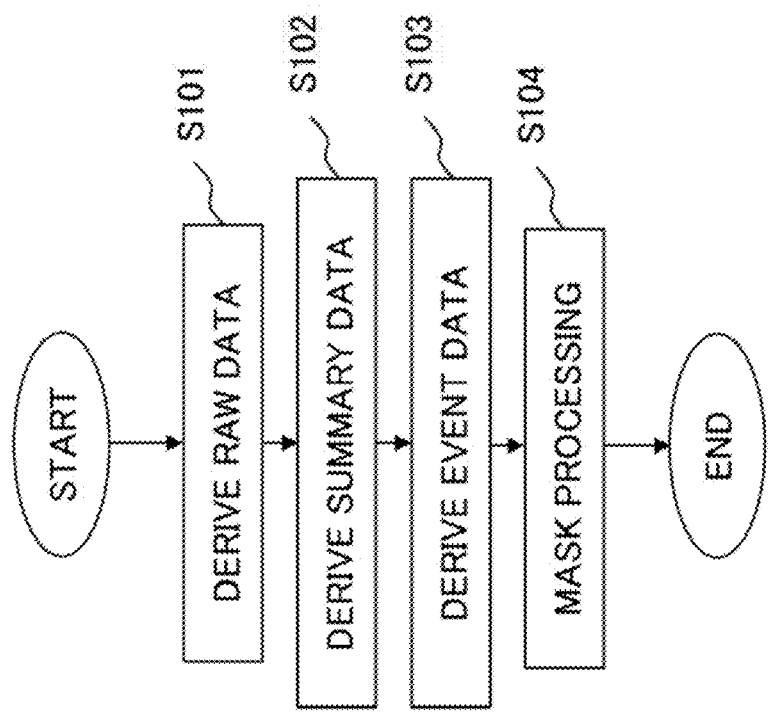
FIG. 8 is a conceptual diagram illustrating a processing flow example in the DAS system according to the first example embodiment.

FIG. 8 is a conceptual diagram illustrating an example of processing performed by the processing unit 101 of an interrogator 100 in FIG. 7. FIG. 8 is addition of processing in S104 after processing in S103 in FIG. 6. The processing in S101 to S103 in FIG. 8 is the same as that in FIG. 6, and description thereof is omitted herein.

In the processing in S104, the processing unit 101 performs the above-described mask processing on acquisition data. Herein, acquisition data include at least one of RAW data, summary data, and event data, as described above. The processing in S104 is performed by the mask unit 101b in FIG. 7.

Kinds of mask processing also include a kind that dynamically changes a mask condition, based on an event identified by the identification unit 101c. Thus, the mask unit 101b also receives event data being an output from the identification unit 101c, in addition to RAW data and summary data being outputs from the acquisition processing unit 101a.

RAW data, summary data, and event data after mask processing are stored on the external storage unit 102 or image-displayed by the external output unit 106 via an output I/F 107. Data before mask processing are designed and produced with care in such a way as never to be output to the outside of the interrogator 100.

It is desired that the interrogator 100 be covered by a housing or the like that is extremely difficult to open without breaking the inside. For example, strongly welding a joint of a housing formed of a metal being difficult to cut is considered effective. It is desired to have a structure that does not operate any more at and after forced opening. This is intended to make it extremely difficult to acquire, from inside, data before being subjected to mask processing, or cause an operation differing from a content of a mask setting file to be performed.

One Example of Operation

Figure 9A:
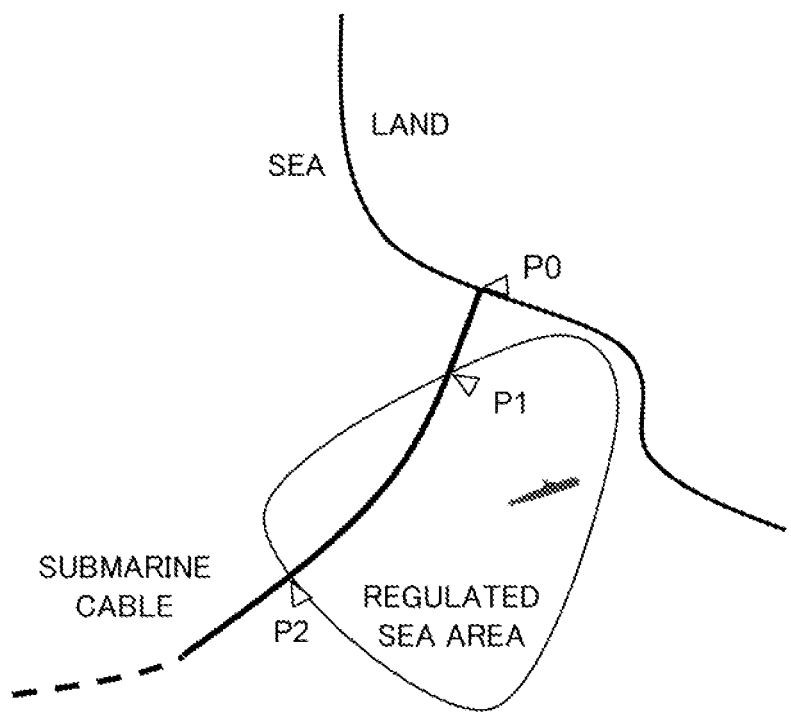
FIG. 9A to FIG. 9C are diagrams for describing an operation of masking acquisition information of a regulated zone in the DAS system according to the first example embodiment.
Figure 9B:
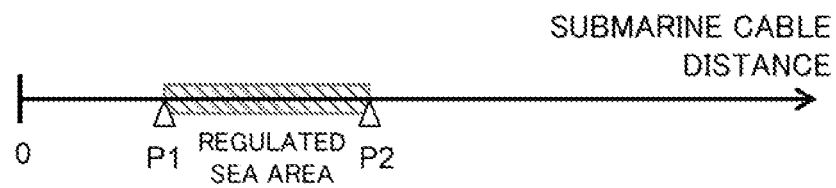
Figure 9C:
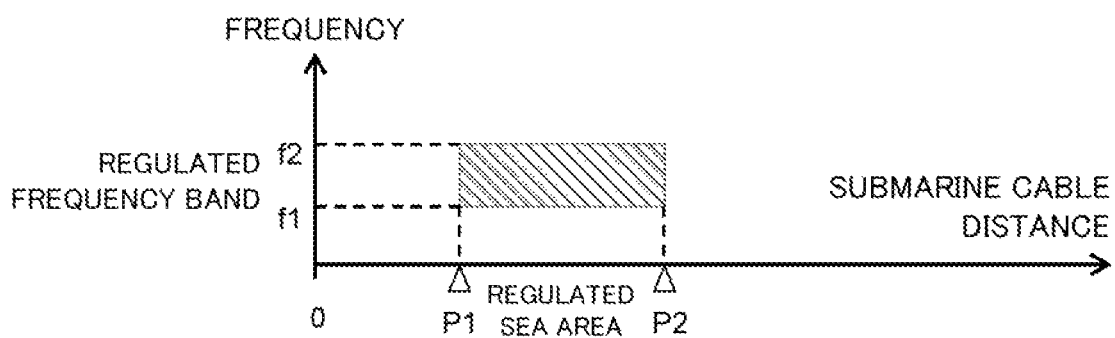

FIGS. 9A to 9C are image diagrams illustrating a representative example of an operation performed by the DAS system according to the present example embodiment. FIG. 9A is an image diagram illustrating a way of installing a submarine cable including the sensing optical fiber of the optical fiber sensing system.

As represented in FIG. 9A, a submarine cable is laid on a sea side from a position P0 being a landing point. A non-illustrated interrogator connected to the submarine cable is present at the position P0 being a landing point, and the interrogator is able to acquire environmental information of a periphery of the submarine cable. A sea area where acquisition of environmental information is regulated is set in the sea, and a section from a cable distance P1 to a cable distance P2 being one part of the submarine cable passes through the regulated sea area. A regulated sea area is, for example, a sea area where there is a possibility that a military action is performed, and acquisition of, for example, environmental information with which an action of a vessel, a submarine, or the like may be found is regulated.

FIGS. 9B and 9C are image diagrams each illustrating an example of a regulation rule for an acquisition action of acquisition data by optical fiber sensing. Herein, acquisition data targeted for regulation are every kind of data containing information acquired by optical fiber sensing, such as RAW data, summary data, and event data described in the paragraph Background Art.

In a regulation rule represented in FIG. 9B, all pieces of acquisition information within a submarine cable distance between P1 and P2 are a case where acquisition is prohibited. Actually, information of a periphery of a submarine cable including information between P1 and P2 is brought as return light into an interrogator situated at the position P0 of the landing point. The interrogator according to the example embodiment includes a structure of not outputting, to the outside, acquisition information of a regulated sea area at least in a form that can be utilized without modification.

A mask target section differs according to an installation place of an interrogator. Thus, a structure is provided in which an interrogator does not operate until a mask condition specified by, for example, a nation or the like is generated as a mask setting file, and read by the interrogator. As described later, the mask setting file does not allow forgery or rewriting by use of an electronic signature (certificate) technique.

On the other hand, a regulation rule represented in FIG. 9C further targets a frequency range of f1 to f2 for regulation, in information within a submarine cable distance between P1 and P2. In FIG. 9B, since all frequency ranges are targeted for regulation, a regulation range is smaller in FIG. 9C. One example of such case is a case where acquisition is regulated in a frequency range in which a mechanical sound or a propulsion sound generated by a submarine or a marine vessel appears, but observation is permitted for a sound or vibration of a low frequency, such as a submarine earthquake or a landslide.

By describing a condition in a mask setting file and causing an interrogator to read the condition, an observation that does not breach a regulation can be performed under the regulation rule as in FIG. 9C as well.

One example of an operation performed by the interrogator according to the present example embodiment has been described above. In the following description, a specific example of a mask condition, and a specific example of a mask processing content are described.

In basic mask setting, setting values regarding at least the following three items are desirably specified as one set.

(1): A mask activation condition. (2): A positional range (a start position and an end position) on a cable targeted for masking, and a frequency range (a high-range boundary and a low-range boundary). (3): The kind of mask processing.

Furthermore, the number of sets of the mask setting is not limited to one, and a plurality of sets may be specified for one sensing cable.

[Mask Activation Condition, Mask Range]

(1): The mask activation condition is a condition for validating a mask. Setting values of the mask activation condition are, for example, a value being relevant to "constant", "specification period", "information due to an external factor of a transmission/reception device", and the like. "Constant" means that the mask is constantly valid. "Specification period" is an activation condition specifying a period, such as the mask being valid from Mar. 15, 2020 to Jul. 10, 2020. "Information due to an external factor of a transmission/reception device" is, for example, validating the mask when an amount of insolation around the installation place of the sensing optical fiber 200 exceeds a certain threshold value (when it becomes bright), or the like. Herein, the transmission/reception device is the interrogator 100.

Setting contents of (2): a position (a start position and an end position) on a cable targeted for masking and a frequency range (a high-range boundary and a low-range boundary) are as described with reference to FIGS. 9B and 9C. For example, a setting value meaning targeting for masking regardless of a frequency as in FIG. 9B is also defined. For example, a setting value is defined in such a way that a high-range boundary and a low-range boundary being both 0 means all frequency ranges being mask targets.

(3): A kind of mask processing is described later.

As setting of the above-described mask activation condition, a mask activation condition based on event data is also achievable in addition to basic "constant" and "specification period". The identification unit 101c generates event data by automatically detecting an event from RAW data and summary data by use of a technique such as pattern recognition, and inputs the event data to the mask unit 101b. An operation can be achieved in which the mask unit 101b masks or unmasks a periphery of an object, based on the event data, when there is a target event. Such a mask activation condition is referred to as an event driven type.

An event-driven-type mask activation condition is exactly an event kind in event data. For example, as described in Background Art as well, various matters such as an earthquake, a collision sound, a gunshot sound, a shout of a person, and sailing of a specific ship can be conceived. An example of event-driven-type mask processing is described later in description of [active mask processing].

As an application of an event-driven-type mask condition, it is also possible that a target for monitoring generates an artificial sound, and thereby, a mask is activated. Herein, monitoring refers to acquisition of acquisition information by optical fiber sensing. A specific acoustic pattern clearly distinguishable from background noise or the like is intentionally scattered around, an interrogator detects the acoustic pattern, and, thereby, mask processing is activated. It is also possible that, when the acoustic pattern is desired not to be recorded and imitated, the acoustic pattern to be a constantly changing pattern, by sharing in advance key information of how to change the acoustic pattern between an interrogator and a concealed object.

[Kind of Mask Processing]

(3): A kind of mask processing is described. Since a target of mask processing in the present example embodiment is digital numerical value data, various well-known methods are applicable as a mask processing method of digital numerical value data. The mask processing method includes an irreversible method such as deletion, and a reversible method such as scrambling.

First, four kinds of examples of irreversible mask processing are described.

Figure 10:
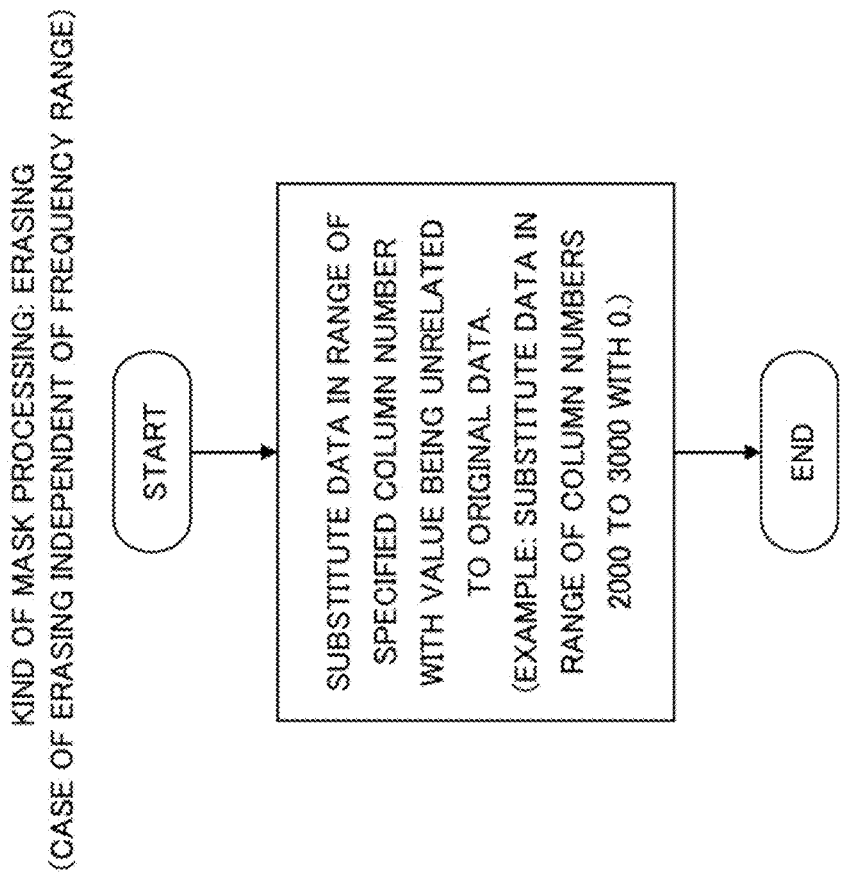
FIG. 10 is a conceptual diagram illustrating an example of mask processing (when not dependent on a frequency) when the kind of mask processing is erasing.

A first example of irreversible mask processing is deletion. For example, in the RAW data illustrated in FIG. 3, when data (numerical value) of which column numbers indicating positions in a cable range between 2000 and 3000 are substituted with 0, information in the section is deleted. A numerical value to be substituted for is not limited to 0, and any numerical value that is not related to original data results in deletion of information. A numerical value to be substituted for may be a random number. A processing example being relevant to mask processing example of deletion described above is illustrated as FIG. 10. Description of FIG. 10 is as depicted in the same figure, and is therefore omitted.

Figure 11:
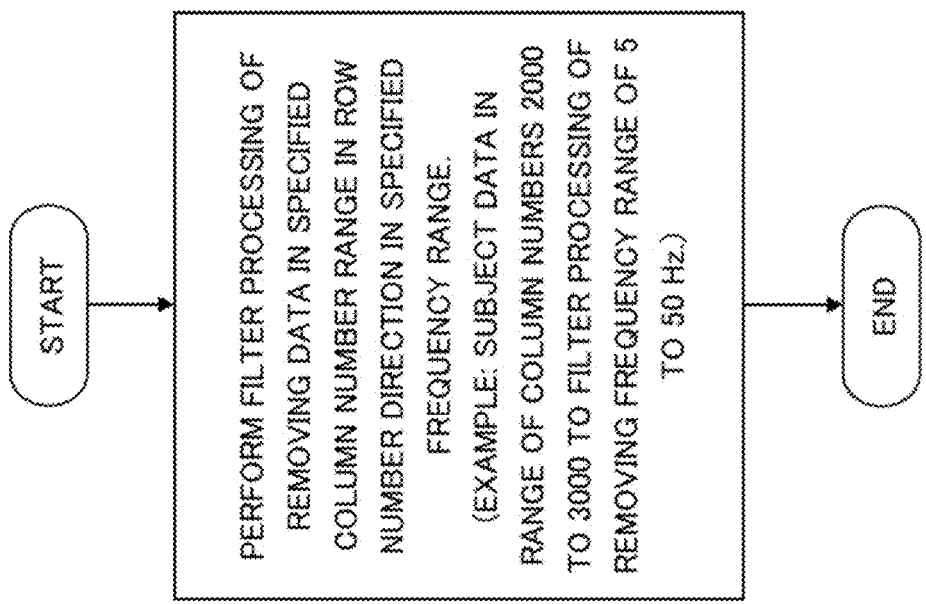
FIG. 11 is a conceptual diagram illustrating an example of mask processing (when dependent on a frequency) when the kind of mask processing is erasing.

Next, an example of mask processing of deleting acquisition data when only acquisition data in a specific frequency range are targeted for regulation in a specific section on a cable is described. For example, it is assumed that, in a positional range being relevant to column numbers 2000 to 3000 in RAW data in FIG. 3, acquisition of acquisition information regarding a frequency range of 5 Hz to 50 Hz is regulated. In this case, data with column numbers 2000 to 3000 are subjected to filter calculation processing of removing a part corresponding to a frequency of 5 Hz to 50 Hz. Specifically, outputs of a filter passing a frequency side lower than 5 Hz and a filter passing a frequency side higher than 50 Hz are added together. Actually, the pieces of processing are numerical value calculation processing. A processing example being relevant to a mask processing example of deleting acquisition data in only the specific frequency range described above is illustrated as FIG. 11. Description of FIG. 11 is as depicted in the same figure, and is therefore omitted.

A method using fast Fourier transform (FFT) and inverse fast Fourier transform (inverse FFT) are well known as filter processing on digital numerical value data. In such method, numerical value data are converted into a frequency region by performing fast Fourier transform, data in a regulated frequency range are then substituted with a numerical value being unrelated to original data, the numerical value is returned to a time region by inverse fast Fourier transform, and, thereby, masking of a specific frequency range is executed. This method is performed by sliding a data range in a time direction to be subjected to FFT while being partially superimposed. This method is a well-known calculation as a method of acquiring a running spectrum. This method is combined with filter processing to form mask processing.

Figure 12:
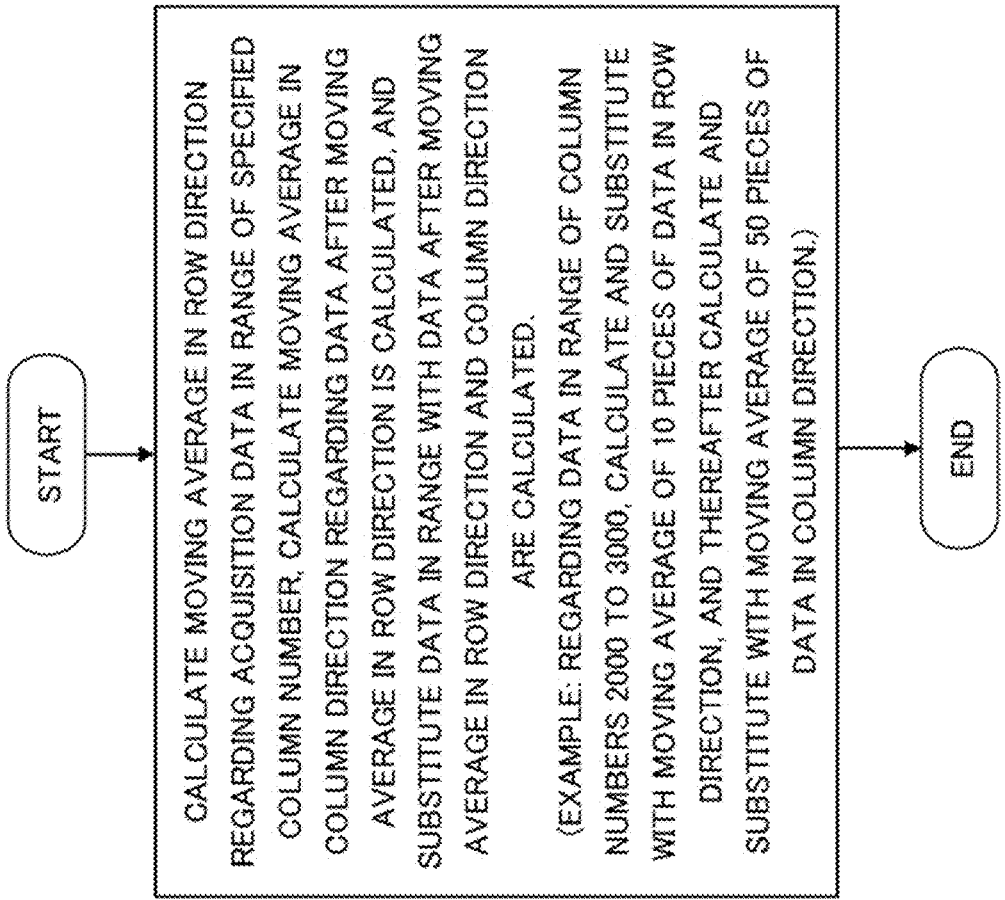
FIG. 12 is a conceptual diagram illustrating an example of mask processing when the kind of mask processing is blurring.

Second irreversible mask processing is blurring of acquisition data. This processing may be representatively achieved by moving average calculation. For example, it is assumed that, in the RAW data illustrated in FIG. 3, a range of column numbers 2000 to 3000 indicating positions in a cable is a regulation range. In such case, as a value in the range, a moving average of 10 pieces of consecutive data in a row direction is acquired regarding the row direction. Next, regarding data after the moving average in the row direction is performed, a moving average in a range of 50 pieces of consecutive data in a column direction is acquired regarding the column direction. By substituting data in a range of column numbers 2000 to 3000 with data after the moving average is performed, acquired as above, blurring of acquisition data regarding the range can be achieved. A processing example being relevant to the mask processing example of blurring described above is illustrated as FIG. 12. Description of FIG. 12 is as depicted in the same figure, and is therefore omitted.

Smoothing processing by filter processing in a column direction being a time axis direction is equivalent to removal of a high-frequency component. Therefore, a blurring processing method is also achievable by performing high-frequency component removal filter processing in a specified range of a column direction and further in a row direction.

Figure 13:
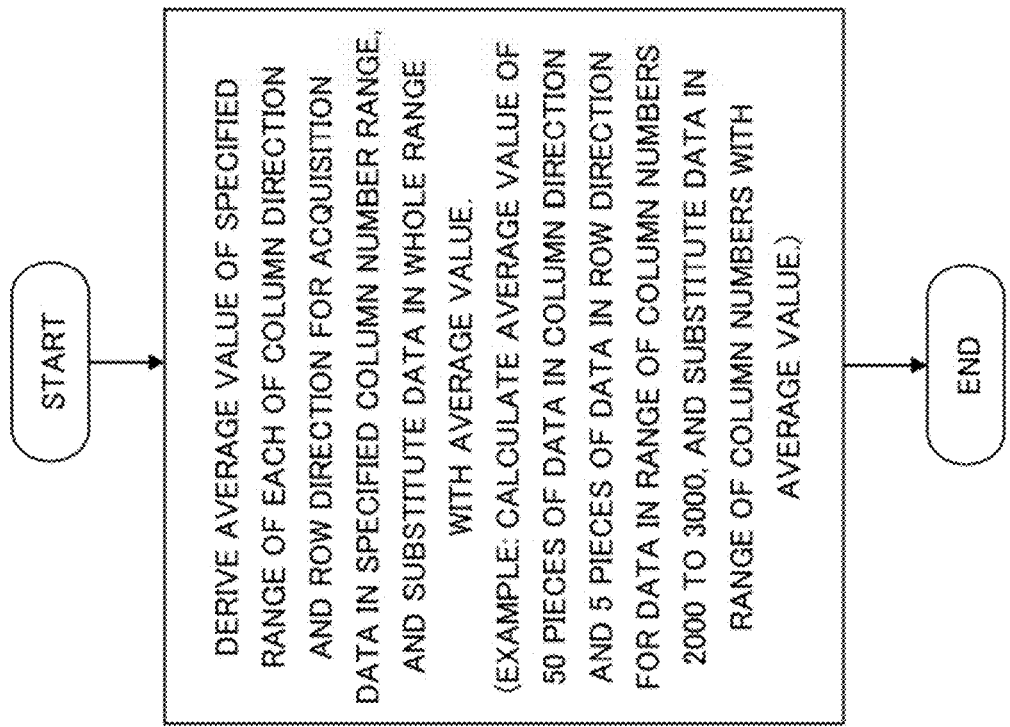
FIG. 13 is a conceptual diagram illustrating an example of mask processing when the kind of mask processing is mosaicization.

Third irreversible mask processing is mosaicization. Mosaicization is processing similar to processing performed when summary data are generated from RAW data. For example, it is assumed that, in the RAW data illustrated in FIG. 3, a range in which column numbers indicating positions on a cable are 2000 to 3000 is a regulation range. In such case, this processing is achieved by dividing values in the range into a range of 5 pieces of data in a row direction and 50 pieces of data in a column direction, acquiring a representative value in each division range, and substituting a value in each division range with each representative value. Data in a division range become a uniform value. An algorithm of acquiring the representative value is, for example, average. A processing example being relevant to the mask processing example of mosaicization described above is illustrated as FIG. 13. Description of FIG. 13 is as depicted in the same figure, and is therefore omitted.

When the blurring or mosaicization described above is applied, a processing parameter (e.g., a range of performing data processing) is adjusted in such a way that an object desired to be prevented from being discerned is obscured to an indiscernible degree, and is specified in mask setting.

Fourth irreversible mask processing is transparentizing of acquisition data. When transparentizing is performed, the whole sensing range is regarded as an aggregate of data ranges divided into predetermined distance units. A data range herein is a range of a data column.

First, acquisition data in each data range when no event is detected are stored as background sample data (FIG. 14A). Then, when transparentizing of acquisition data in a certain data range is performed, the acquisition data are substituted with the background sample data in the certain data range (FIG. 14B).

Acquisition data have, even when no event has occurred, background noise according to an environmental condition at the time. Thus, when transparentizing is performed, it is desirable to perform substitution after adjusting an amplification factor in such a way that a background noise amplitude included in background sample data is at the same degree as a background noise amplitude of a mask target point.

A processing example being relevant to the mask processing example of transparentizing described above is illustrated as FIGS. 14A and 14B. FIG. 14A describes an acquisition procedure of background sample data. Background sample data are stored together with a background noise volume NPb thereof for each data range in which the whole sensing range is divided into predetermined distance units. This procedure is executed at a regular time interval, and background sample data are updated as appropriate.

FIG. 14B describes a procedure of transparentizing processing. First, current background noise volumes NPc1 and NPc2 of a data range being adjacent to a data range in which an event targeted for a transparentizing mask is detected are calculated, and an average value NPc thereof is acquired. Subsequently, data in the data range in which the event is detected is substituted with data acquired by multiplying, by NPc/NPb, background sample data in the data range in which the event is detected.

While deletion is apparent in the above-described deletion, transparentizing has an effect of making it difficult to discern that acquisition data of a transparentized part are not an actual object. Particularly, in the above-described event-driven-type mask activation condition, it is effective when a mask range is moved in association with a moving object. When a target range is substituted with data of a fixed value by the above-described deletion, a movement of an object desired to be concealed can be clearly seen, which is not desirable. In transparentizing, substituting with sample data when no event exists enables a fact that data in a masked part are not real to be unnoticeable.

Figure 15:
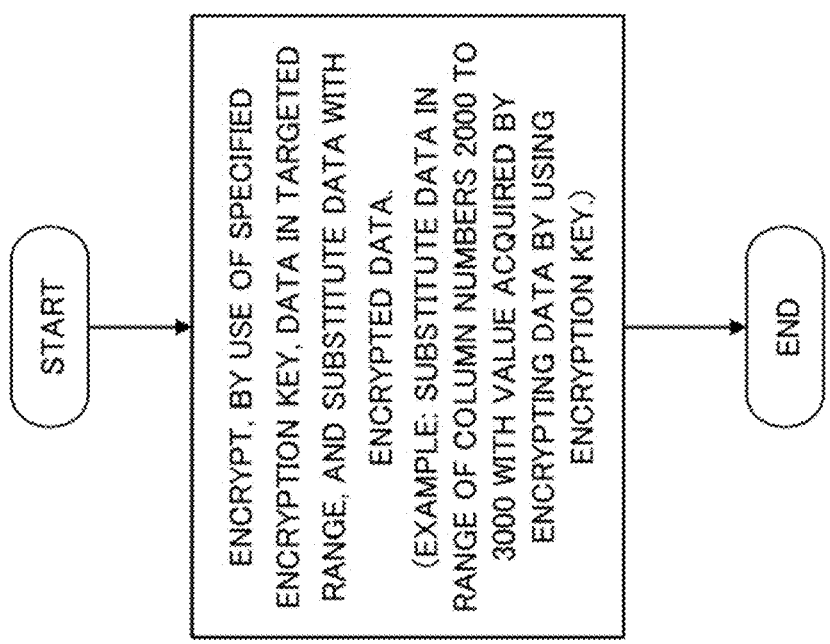
FIG. 15 is a conceptual diagram illustrating an example of mask processing when the kind of mask processing is encryption.
Figure 16:
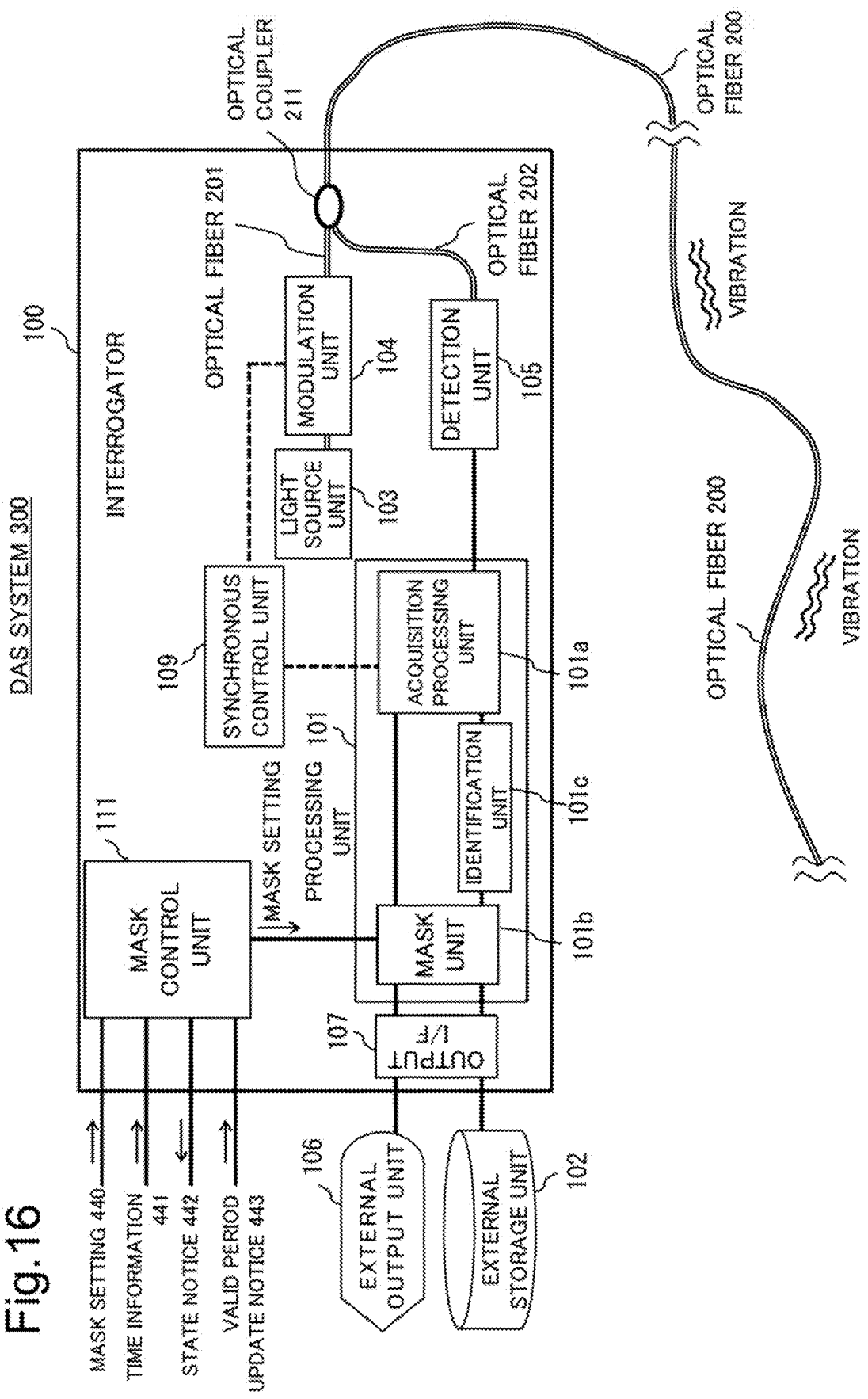
FIG. 16 is a conceptual diagram illustrating a configuration example of a DAS system according to a second example embodiment.

Next, a processing example of reversible mask processing is described. In order to perform reversible mask processing, a well-known method of encryption (scrambling) and decryption (unscrambling) of digital data is used. For example, it is assumed that, in the RAW data illustrated in FIG. 3, a range in which column numbers indicating positions on a cable are 2000 to 3000 is a regulation range. In such case, a value in the column number range is substituted with data encrypted by use of an encryption key. A party having a decryption key can perform decryption of the encrypted data in the column number range, and restore original data. A processing example being relevant to the reversible mask processing example described above is illustrated as FIG. 15. Description of FIG. 15 is as depicted in the same figure, and is therefore omitted.

When a specific frequency range is targeted for regulation, data in the specific frequency range are encrypted by an encryption key after being converted into data in a frequency region by use of fast Fourier transform. Reversible mask processing can be achieved by converting the data into data in a time region by inverse fast Fourier transform. Processing in which a party having a decryption key performs decryption can also be similarly performed.

It is also possible to apply a plurality of levels of encryption by use of a plurality of encryption keys according to an access right level. For example, when there are two stages of access right, a party having only a low-order right has only a decryption key for the low-order right, and, therefore, a range in which decryption can be performed is limited. A party having no high-order right has a decryption key for the high-order right in addition to the decryption key for the low-order right, and, therefore, all ranges can be decrypted.

Although a case of RAW data has been described by way of example in the above description of a kind of mask processing, the same also applies to summary data. Mask processing is possible for event data as well. In a case of mask processing of event data, for example, event data generated in a distance range in which mask processing is specified is masked. In this case, alternatively, event data of an event kind specified for masking is masked. Alternatively, a combination thereof may be performed. Deletion or encryption is typically assumed as a kind of masking when event data are masked.

For example, methods disclosed by PTLs 2 to 7 can be used for the mask processing described above.

Acquisition data in which a predetermined range has been subjected to mask processing are output to the external storage unit 102 or the external output unit 106 outside an interrogator. For the acquisition data output from the interrogator as well, protection of data may be performed by applying a generally used data protection method. For example, an access right is set for a data file, and only a user having a right to see the content or copy data is allowed to access. Alternatively, access may not be allowed until a certain period elapse from acquisition of acquisition data.

[Active Mask Processing]

In the mask setting (typically, a set of a mask activation condition, a mask range, and a kind of mask processing) described above, mask processing according to acquired information also becomes achievable when the above-described event-driven-type mask activation condition is used. This is hereinafter referred to as active mask processing. Two examples of active mask processing are described.

A first example is as follows. Specifically, first, the identification unit 101c in FIG. 7 detects an object generating a specific acoustic pattern, and identifies as a certain event data. It is assumed that an event-driven-type mask condition is set for a kind of event represented by the event data. Further, it is assumed that the mask condition has, as a mask section, a range provided with a specified margin around a place where an event has been detected. Further, it is assumed that the kind of mask processing is transparentizing.

When the object has moved, a detection position of the object in the event data moves, and, therefore, a mask section also automatically moves. The mask processing is canceled after a certain degree of time elapses since the object goes far, and an event is no longer detected.

In a case of such example, it becomes difficult to grasp, from acquisition data output from the interrogator 100, what has passed and where.

A second example is an example of a method that more positively utilizes active mask activation. It is assumed that a certain object intentionally scatters around a specific acoustic pattern clearly distinguishable from background noise or the like. In such case, the identification unit 101c in FIG. 7 detects the acoustic pattern, and activates a desired mask. In a case of such example, it is desired that the acoustic pattern be a pattern constantly and randomly changing in such a way as not to be recorded and imitated. Thus, it is assumed that secret key information for randomly changing an acoustic pattern is shared in advance between the interrogator 100 and the object. It is assumed that the kind of mask processing is, for example, transparentizing.

For example, a method well known as a generation and authentication method of a time-synchronization-type one-time password is utilized as a method of sharing a randomly changed acoustic pattern between on an emitting side and a sensing side.

In one-time password generation and authentication, a common calculation formula for generating a random number, based on a time is stored in advance. A calculation formula shared by only the specific party becomes a secret key. Since it is possible to prepare a large number of kinds of the calculation formulae, when calculation formulae differ, random numbers differing from each other are generated even at the same time. As a result, a partner is authenticatable only between parties sharing a calculation formula.

In the present example embodiment, acoustic pattern authentication between two specific parties is performed by reflecting, in an acoustic pattern, a random number generated based on the above-described secret key (calculation formula) and a time.

Using the active mask processing allows the interrogator 100 to certainly exclude with less omission, from acquisition data, information relating to passage of an object to be excluded.

It goes without saying that an installation place of a cable including a sensing optical fiber according to the present example embodiment described above is any place, such as in air, on land, underground, undersea, or on a seabed.

Effect

The optical fiber sensing system according to the present example embodiment masks acquisition data regarding an optical fiber position or vibration frequency range set in advance. The optical fiber sensing system according to the present example embodiment thereby limits utilization of acquisition data.

Second Example Embodiment

In the example embodiment described above, setting (mask setting) of a mask condition differs depending on an installation place of the interrogator 100 in FIG. 7. When the interrogator 100 is shipped, setting a mask setting section in a factory thereof is difficult, and, therefore, it is necessary that the above-described mask setting to be set adapted to an installation place of a sensing cable for an individual interrogator. Specifically, it is desirable that the interrogator 100 includes a structure capable of setting mask setting by, for example, causing an electronic file being a mask setting file 440 to be read into.

However, when mask setting is able to be altered in any way, it becomes possible to operate the interrogator 100 without appropriate mask setting or with mask setting being incompatible with sensing regulation. In order to prevent such problem, it is desired that the interrogator 100 also includes a structure in which sensing may not be performed unless mask setting conforming to sensing regulation by a nation, a municipality, or the like is set.

Accordingly, as described later, in the present example embodiment, a structure is provided in which monitoring may not be performed unless mask setting is appropriately set in an interrogator.

The following four methods can be conceived as methods for solving the problem.

The first method is including a structure in which the interrogator 100 does not perform a monitoring operation unless a correct mask setting file 440 is read and set in the interrogator 100.

The second method is a falsification prevention method of a mask setting file. For example, a structure is provided in which, for example, a predetermined public issuance institution 410 generates an encrypted mask setting file 440, based on a mask condition permitted by a coastal nation where a target submarine cable passes an exclusive economic zone, and the mask setting file 440 is issued to a monitoring implementer 191 using the interrogator 100.

The third method is to provide a mask setting file with a valid period that is automatically invalidated when a predetermined period passes.

The fourth method is regular monitoring of use status (operation status) of the interrogator 100. For the monitoring, the interrogator 100 sends, for example, use status to a monitoring server 500 at a predetermined regular timing by communication. The monitoring server 500 automatically checks whether the interrogator 100 is improperly used, and informs the interrogator 100 of extension of a valid period of a mask setting file only when there is no problem. When not receiving the term update, the interrogator 100 no longer performs a monitoring operation by optical fiber sensing after the valid period.

Details of the structures are described below.

[Issuance Management of Mask Setting File]

Figure 17:
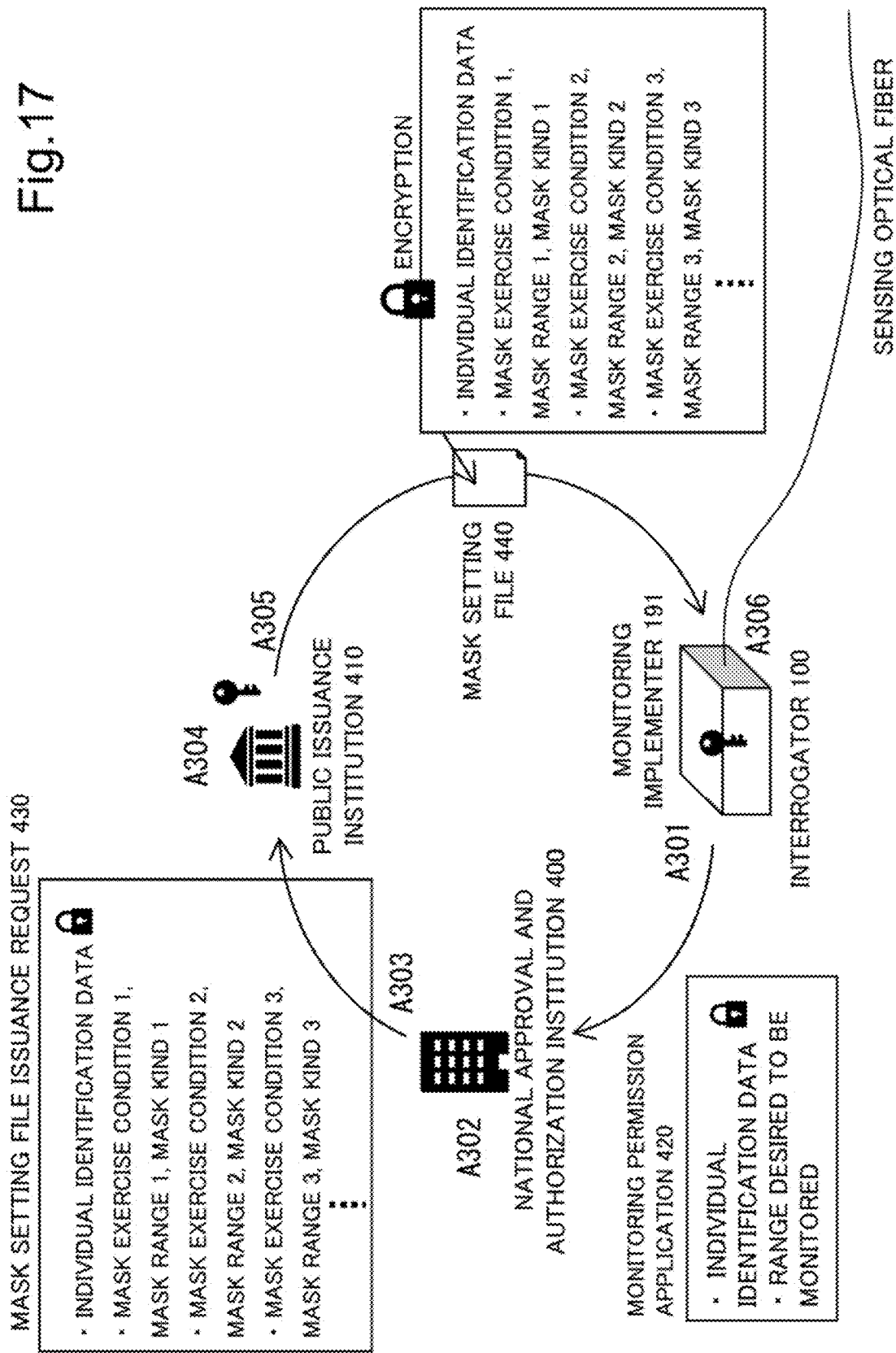
FIG. 17 is an explanatory diagram of a flow from application of monitoring to arrival of a mask setting file.

FIG. 17 is a diagram for describing a flow from application to issuance of a mask setting file.

First, as an action of A301, an implementer 191 of monitoring by fiber sensing applies for permission of monitoring to a party, for example, an approval and authorization institution 400 of the coastal nation government (nation) managing a monitoring action in a zone where monitoring by a cable is performed. A monitoring permission application 420 being an application form of the monitoring includes, for example, individual identification data of the interrogator 100, and a route coordinate of a cable connected to the interrogator i.e., information of a zone desired to be monitored. Herein, the individual identification data are desirably, for example, encrypted for misrepresentation prevention. For example, the individual identification data are encrypted data including a manufacture serial number, a media access control (MAC) address, and the like of the interrogator 100.

As an action of A302, the approval and authorization institution 400 reviews, investigates, and determines approval and authorization of monitoring regarding the application. When, as a result of the determination, a regulated zone is partly included, but monitoring is authorized on a condition that appropriate mask setting is performed, the approval and authorization institution 400 requests a credible public issuance institution 410 for issuance of a mask setting file, as an action of A303. A mask setting file issuance request 430 being a request form related to the request includes individual identification data and information of a mask condition. Monitoring may not be authorized at all as a result of determination. In such case, the approval and authorization institution 400 is assumed to notify the monitoring implementer 191 of the fact.

As an action of A304, the public issuance institution 410 generates an encrypted mask setting file 440 in which a mask setting content requested for issuance is included. Then, as an action of A305, the public issuance institution 410 sends the mask setting file 440 to the monitoring implementer.

As an action of A306, the monitoring implementer 191 reads the encrypted mask setting file 440 into the interrogator 100. The interrogator 100 holds in advance a key for decryption. Thus, the interrogator 100 decrypts the read mask setting file 440, and confirms that individual identification data match individual identification data of the interrogator 100, and performs mask setting included in the mask setting file 440. This allows the interrogator 100 to perform a monitoring operation of a permitted range for a cable.

As understood from the above, the mask setting file 440 can otherwise be expressed as a monitoring permit. A reason for this is that the mask setting file 440 serves to cause setting for masking acquisition information of a regulated zone to be performed, and permit monitoring in other application zones.

For example, techniques of an electronic signature and an electronic certificate can be used for encryption and decryption of electronic information. The techniques are well known, and, for example, is disclosed in NPL 2.

The above-described application by the monitoring permission application 420, request by the mask setting file issuance request 430, and provision of the mask setting file 440 are each typically performed by electronic data with regard to chief information.

[Management of Proper Use]

It is problematic that a once properly issued mask setting file is indefinitely valid. A reason for this is that, for example, there is a risk of an interrogator in which a loose mask condition is set being sold and used for another purpose in another place. In order to prevent such problem, it is effective to provide a structure in which a mask setting file is given a valid period, and the valid period is automatically updated at a predetermined interval.

In order to prevent improper acquisition of information by reselling or the like of an interrogator, it is preferable to shorten a valid period. However, such a procedure as illustrated in FIG. 17 includes a manual work of determining approval and authorization of monitoring, and is therefore generally expected to require a number of days. Thus, when a valid period is shortened and an update frequency of the mask setting file 440 is shortened, there is a concern that a workload becomes excessive and becomes a problem. Therefore, a valid period is typically assumed to be one year or more, and may not be shortened too much.

Figure 18:
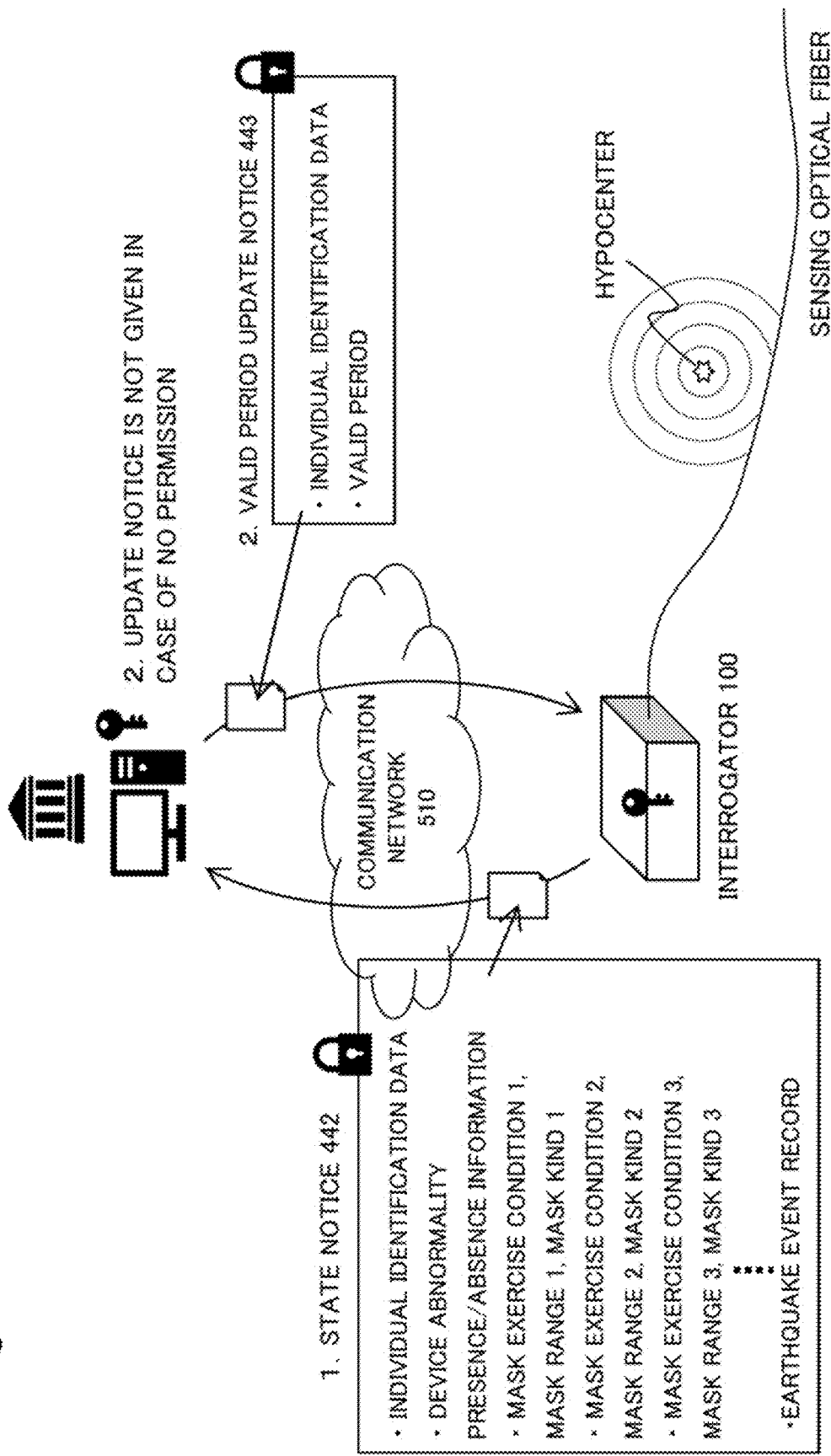
FIG. 18 is an explanatory diagram of an automatically performed improper use monitoring method.

In order to solve the problem, it is desirable to include a structure of automatically monitoring whether proper use is made in a short regular cycle. Accordingly, a structure of automatic permission validity confirmation via a network, described next with reference to FIG. 18, is provided.

The structure of automatic permission validity confirmation via a network is described next with reference to FIG. 18.

The interrogator 100 automatically performs regular notice 442, with a monitoring server 500 connected via a communication network 510. The communication is, for example, regularly performed. The monitoring server 500 is typically run by an institution that has issued a mask setting file, and holds or can refer to a content of a latest mask setting file of each interrogator.

The interrogator 100 gives, at a predetermined timing, a notice 442 to the monitoring server 500, of individual identification data, information representing a content of mask setting, and information representing current running status and operation status. The monitoring server 500 also holds mask setting information. Thus, the interrogator 100 may determine in advance, with the monitoring server 500, a hash function enabling detection of falsification of a check sum value, hash function and the like of mask setting information, and send the hash value to the monitoring server 500.

Then, when it is automatically determined, by the information 442 sent from the interrogator 100, that use of the interrogator 100 is proper, the monitoring server 500 gives a notice 443 of extension of a valid period of a mask setting file to the interrogator 100. On the other hand, when it is determined that use of the interrogator 100 is inappropriate or when regulation reinforcement is needed, the monitoring server 500 does not extend a valid period of a mask setting file. When the interrogator 100 does not receive the notice 443 of extension of a valid period from the monitoring server 500, the valid period expires, and acquisition of information by optical fiber sensing may not be performed.

The structure in FIG. 18 only confirms whether each interrogator is used in a permitted way, and does not reexamine a mask setting content itself. Thus, a rapid determination and response can be automatically made.

Even when such a regular monitoring method as in FIG. 18 is used, there remains a concern that an installation place of the interrogator 100 is misrepresented. For example, an interrogator from which a mask setting file has been acquired by applying monitoring in an unregulated place may be brought into a regulated place and perform monitoring. Thus, it is desired to provide a structure remotely monitoring that the interrogator 100 is used in a permitted place.

As one method of confirming that an interrogator is used in a permitted place, utilization of, for example, an earthquake event is conceivable. Almost all pieces of information relating to earthquakes equal to or more than certain magnitude that have occurred on earth are recorded and published. An influence of an earthquake wave is localized, a speed thereof is finite, and, therefore, a detection time clearly delays substantially in proportion to a distance from an earthquake center. Thus, earthquake event data detected by each interrogator serves a purpose similar to "fingerprint" of a place where a cable is situated. Whether an installation route of a cable matches a route for which approval and authorization are applied may be confirmed by comparing a detection result of an earthquake event sensed by the cable with published earthquake data.

When the number of earthquake events to be contrasted is one, there is a risk of misdetermination, therefore it is more desirable to contrast a plurality of events.

As another confirmation means for confirming that an interrogator is used in a permitted place, utilizing, for example, a sound of thunder can also be conceived. A reason for this is that a sound of thunder may be used as contrast data because a thunder occurrence place and time are published.

Alternatively, it is also possible to artificially generate a sound or vibration, transform the sound or vibration into an event, and contrast an occurrence time or an occurrence place in a record of the event. This method is particularly effective when a monitoring range is not so wide.

[Additional Component of Interrogator]

A structure added to the interrogator 100 in the second example embodiment is described by contrasting FIG. 7 to FIG. 16. An input of the mask setting file 440 is intended to enable to set a mask of a condition meeting a need, for an individual interrogator. Time information 441 is information that is always needed by a sensing (monitoring) device in order to keep a record of when and what sensing data are acquired. An input of the time information 441 is typically supplied from a device that receives an electric wave from a global navigation satellite system (GNSS) satellite and supplies high-accuracy time information. In this way, although not illustrated in the first example embodiment, inputs of the mask setting file 440 and the time information 441 are ought to be implemented.

Furthermore, in the second example embodiment, an input of the time information 441 is necessary in achieving a structure that disenables a sensing operation when a valid period expires. When a proper time information 441 is not present, it is desirable that the interrogator 100 also includes a structure that disenables a sensing operation. A failure of a time information supply device or the like may be prepared for by providing a plurality of inputs of the time information 441.

An output of the state notice 442 and an input of the valid period update notice 443 are communications for management for proper use described by use of FIG. 18. The above communications to a mask processing unit 111 do not need to be physically separated, and may be consolidated in, for example, one Ethernet (registered trademark) interface port.

A non-illustrated encryption key for performing an improper change prevention communication with the public issuance institution 410 and the monitoring server 500 is saved in the interrogator 100 at factory shipment. Individual identification information is described in an encrypted form at communication, and is therefore not validated even when, for example, the same communication message is input to the interrogator 100 being another individual. Such a structure is implemented in the mask control unit 111 inside the interrogator 100.

Effect

When a monitoring method according to the present example embodiment is used, a credible public institution can ensure that a regulated section is not monitored by the interrogator. This brings about a possibility that acquisition of sensing information is admitted regarding outside of a regulated section, even in optical fiber sensing using a cable partially passing the regulated section.

In the above description, an example in which RAW data are information representing vibration of a sensing optical fiber has been mainly described. However, RAW data may otherwise represent pressure or temperature of a sensing optical fiber. As long as RAW data represent a degree of a change resulting from an environment of a sensing optical fiber, the RAW data may represent a degree of a change of anything other than a phase.

In the above description of mask processing, description has been given with a mask processing flow illustrated in FIG. 8. This has been described with a highly versatile processing flow that can be described even with any mask condition or a mask kind in describing a content of mask processing, and unnecessary processing is omittable depending on a mask condition or a mask kind, without performing the whole flow.

For example, since mask processing of a mask condition that is not an event driven type does not need "derivation of event data" in S103 of FIG. 8, it is apparent that the processing is possible before S103 without performing S103. For example, for only mask processing that uniformly erases a certain cable section, it is possible that the processing is performed simultaneously with "derivation of RAW data" in S101, and the processing in S102 and S103 is not performed.

In the above description, a case of DAS classified into an OTDR type has been described by way of example as a method of distributed optical fiber sensing. However, a method of distributed optical fiber sensing according to an example embodiment is not limited to DAS, and may be a sensing method expressed with another name. The method expressed with another name includes, for example, DVS, DTS, and BOTDR. Herein, DVS is an abbreviation of distributed vibration sensing. DTS is an abbreviation of distributed temperature sensing. BOTDR is an abbreviation of Brillouin optical time-domain reflectometry. Further, optical fiber sensing may be optical fiber sensing capable of performing distributed sensing widely, other than OTDR. For example, PTL 8 and NPL 3 each disclose a distributed optical fiber sensing technique using transmission light, instead of OTDR using reflected return light.

Figure 19:
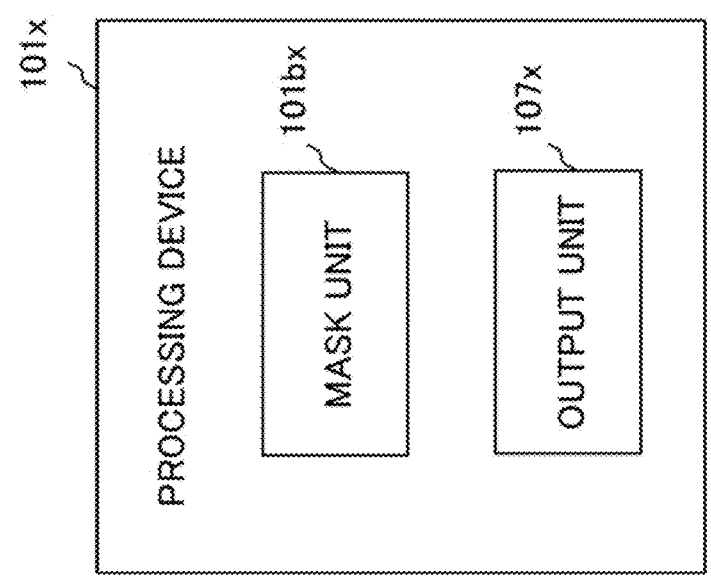
FIG. 19 is a block diagram illustrating a minimum configuration of a processing device according to an example embodiment.

FIG. 19 is a block diagram illustrating a configuration of a processing device 101x being a minimum configuration of a processing device according to an example embodiment.

The processing device 101x is included inside a transmission/reception device used for optical fiber sensing by an optical fiber. The processing device 101x includes a mask unit 101bx and an output unit 107x. The mask unit 101bx masks a predetermined range in acquisition data being data acquired by the transmission/reception device through the optical fiber sensing. The output unit 107x outputs, to the outside of the transmission/reception device, post-masking data being the data on which the masking has been performed. The processing device 101x does not output, to the outside, the acquisition data before the masking regarding the predetermined range is performed.

By the above-described configuration, the processing device 101x enables limiting, as needed, utilization of the acquired acquisition data in a predetermined range.

Thus, the processing device 100x provides the effect described in the paragraph [Advantageous Effects of Invention], by the above-described configuration.

While each example embodiment of the present invention has been described above, the present invention is not limited to the above-described example embodiments, and a further modification, replacement, and adjustment can be made without departing from a basic technical idea of the present invention. For example, a configuration of an element illustrated in each drawing is one example for helping understand the present invention, and the present invention is not limited to the configuration illustrated in each of the drawings.

Some or all of the above-described example embodiments can also be described as, but are not limited to, the following supplementary notes.

Supplementary Note 1

A processing device being included inside a transmission/reception device used for optical fiber sensing by an optical fiber, the processing device including:
  a mask means for masking a predetermined range in acquisition data being data acquired by the transmission/reception device through the optical fiber sensing; and
  an output means for outputting, to an outside of the transmission/reception device, post-masking data being the data on which the masking has been performed, wherein
  the acquisition data before the masking regarding the predetermined range is performed are not output to the outside.

Supplementary Note 2

The processing device according to supplementary note 1, wherein
  one or more pieces of first combination information being information representing a combination of a target range being a range of the acquisition data on which mask processing being processing for the masking performed by the mask means is performed, an activation condition being a condition for performing the mask processing regarding the predetermined target range, and a kind of the mask processing are settable.

Supplementary Note 3

The processing device according to supplementary note 2, wherein
  the first combination information is changeable.

Supplementary Note 4

The processing device according to supplementary note 2 or 3, wherein
  the activation condition is constant or is a specification period being a specified period.

Supplementary Note 5

The processing device according to supplementary note 4, wherein
  the specification period is based on information resulting from a factor of the outside.

Supplementary Note 6

The processing device according to any one of supplementary notes 2 to 5, wherein
  the activation condition is specified by a kind of event detected from the acquisition data.

Supplementary Note 7

The processing device according to any one of supplementary notes 2 to 6, wherein
the target range is specified by at least one of a position range on a cable including the optical fiber and a frequency range.

Supplementary Note 8

The processing device according to supplementary note 7, wherein the position range is identified by a start position and an end position.

Supplementary Note 9

The processing device according to any one of supplementary notes 2 to 8, wherein
the target range is set in association with a position, of an event detected from the acquisition data, on a cable including the optical fiber.

Supplementary Note 10

The processing device according to any one of supplementary notes 2 to 9, wherein
the activation condition is detection of an object generating a predetermined pattern of a sound or vibration.

Supplementary Note 11

The processing device according to supplementary note 10, wherein
the object and the processing device share in advance a calculation formula for generating a random number, based on time information, and the pattern is generated by use of the random number, and updated.

Supplementary Note 12

The processing device according to any one of supplementary notes 2 to 9, wherein
processing of substituting the acquisition data in the target range with data being unrelated to the acquisition data is deletion.

Supplementary Note 13

The processing device according to any one of supplementary notes 2 to 9, wherein
the kind of the mask processing is blurring, being processing of performing, regarding the acquisition data in the target range, derivation of a moving average, regarding a time direction and a position direction, of the acquisition data in a predetermined temporal range and a positional range.

Supplementary Note 14

The processing device according to any one of supplementary notes 2 to 9, wherein
the kind of the mask processing is mosaicization, being processing of uniformly substituting each piece of the acquisition data in a predetermined temporal range and a positional range constituting the acquisition data in the positional target range, with a representative value of the acquisition data in the range.

Supplementary Note 15

The processing device according to supplementary note 14, wherein the representative value is an average value.

Supplementary Note 16

The processing device according to supplementary note 10, wherein
the kind of the mask processing is transparentizing, being processing of substituting the acquisition data in the target range when the objected is detected with background sample data stored in advance, being the acquisition data when the objected is not detected.

Supplementary Note 17

The processing device according to supplementary note 16, wherein
the substitution is performed by adjusting a level of the background sample data in such a way that a noise volume of the acquisition data when the substitution is performed is equal to a background noise volume being a noise volume of the background sample data.

Supplementary Note 18

The processing device according to any one of supplementary notes 2 to 9, wherein
the kind of the mask processing is encryption, being processing of encrypting the acquisition data in the target range by an encryption key being decryptable by a decryption key associated with the encryption key.

Supplementary Note 19

The processing device according to supplementary note 18, wherein
the encryption is performed by using each of a plurality of the encryption keys according to an access right level.

Supplementary Note 20

The processing device according to any one of supplementary notes 2 to 19, wherein
the processing device is configured in such a way that acquisition of the acquisition data is not performed unless mask setting information in a valid period is input, and
the mask setting information includes the first combination information.

Supplementary Note 21

The processing device according to supplementary note 20, wherein
the mask setting information includes individual identification information being information on which second encryption has been performed and which enables identification of the transmission/reception device, and becomes valid in only the transmission/reception device having the individual identification information.

Supplementary Note 22

The processing device according to supplementary note 21, wherein
the mask setting information includes, in a state where third encryption is performed, information specifying in such a way as not to perform the acquisition of the acquisition data in the target range, being present in an installation route of the optical fiber, where the optical fiber sensing is regulated.

Supplementary Note 23

The processing device according to any one of supplementary notes 20 to 22, wherein
the transmission/reception device sends, to a monitoring server, second combination information being a combination of information representing the mask setting information being set in an own transmission/reception device, and operation status information being information representing at least a part of operation status of the own transmission/reception device,
the monitoring server sends, to the transmission/reception device, notice information representing extension of the valid period in which fourth encryption is performed, when the mask setting information represented by information representing the mask setting information and the operation status information are in a predetermined relation, and,
when confirming that the notice information is addressed to the own transmission/reception device, the transmission/reception device extends the valid period of the mask setting information, and continues the optical fiber sensing.

Supplementary Note 24

The processing device according to supplementary note 23, wherein
the operation status information is the acquisition data or event identification data acquired by identifying an event from the acquisition data, regarding a sound or vibration occurrence place and time of which may be identified by another piece of published recorded information, and the monitoring server monitors whether the operation status information is used in a proper place, by contrasting the acquisition data or the event identification data with the recorded information.

Supplementary Note 25

The processing device according to supplementary note 24, wherein
the sound or vibration the occurrence place and time of which may be identified is an earthquake.

Supplementary Note 26

The processing device according to supplementary note 24, wherein
the sound or vibration the occurrence place and time of which may be identified is a sound of thunder involved in thunder occurrence.

Supplementary Note 27

A processing method being performed within a transmission/reception device used for optical fiber sensing by an optical fiber, the processing method comprising:
masking a predetermined range in acquisition data being data acquired by the transmission/reception device through the optical fiber sensing; and
outputting, to an outside of the transmission/reception device, post-masking data being the data on which the masking has been performed, wherein
the acquisition data before the masking regarding the predetermined range is performed are not output to the outside.

Supplementary Note 28

A recording medium recording a processing program causing
a computer included inside a transmission/reception device used for optical fiber sensing by an optical fiber to execute:
processing of masking a predetermined range in acquisition data being data acquired by the transmission/reception device through the optical fiber sensing; and
processing of outputting, to an outside of the transmission/reception device, post-masking data being the data on which the masking has been performed, wherein
the acquisition data before the masking regarding the predetermined range is performed are not output to the outside.

The optical fiber described in the supplementary notes is, for example, the optical fiber 200 in FIG. 7 or an optical fiber included in the submarine cable in FIG. 9A. The transmission/reception device is, for example, the interrogator 100 in FIGS. 7, 16, 17, and 18. The acquisition data are, for example, the acquisition data acquired by the acquisition processing unit 101a or the identification unit 101c in FIG. 7.

The mask unit is, for example, the mask unit 101b in FIG. 7 or the mask unit 101bx in FIG. 19. The output unit is a part, in the processing unit 101 in FIG. 7, that outputs data to the output I/F from the mask unit 101b.

The processing device is, for example, the processing unit 101 or the interrogator 100 in FIG. 7. The target range is, for example, a combination of the regulated sea area in FIG. 9B or the regulated sea area in FIG. 9C and a regulated frequency range. The activation condition is, for example, the mask activation condition described in the example embodiment. The specification period is a specification period as one example of the mask activation condition described in the example embodiment. The information resulting from an external factor is, for example, information resulting from an external factor described in the example embodiment.

The event is the event described in the paragraph Background Art. The cable is, for example, the submarine cable in FIGS. 9A to 9C. The start position is, for example, a position represented by the cable distance P1 in FIGS. 9A to 9C. The end position is, for example, a position represented by the cable distance P2 in FIG. 9. FIGS. 9A to 9C.

The object is, for example, the submarine described in the example embodiment. The deletion is, for example, the processing illustrated in FIG. 10 or 11. The blurring is, for example, the processing illustrated in FIG. 12.

The mosaicization is, for example, the processing illustrated in FIG. 13. The transparentizing is, for example, the processing illustrated in FIGS. 14A and 14B. The encryption is, for example, the processing illustrated in FIG. 15. The mask setting information is, for example, the mask setting file 440 in FIG. 17.

The second encryption is, for example, encryption performed regarding the mask setting file 440 in FIG. 17. The individual identification information is, for example, the individual identification data in FIG. 17. The third encryption is encryption performed in the state notice 442 in FIG. 18. The operation status information is, for example, information sent by the state notice 442 in FIG. 18.

The server for monitoring is, for example, the monitoring server 500 in FIG. 18. The fourth encryption is, for example, encryption performed in the valid period update notice 443 in FIG. 18. The notice information is, for example, information sent by the valid period update notice in FIG. 18.

The another piece of recorded information is, for example, information regarding an earthquake or information representing a thunder occurrence place and time described in the example embodiment. The processing program is, for example, a program that causes a computer included in the interrogator 100 in FIG. 7, 16, 17, or 18 to execute processing.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2020-013946, filed on Jan. 30, 2020, the disclosure of which is incorporated herein in its entirety by reference.

REFERENCE SIGNS LIST

100 Interrogator
101 Processing unit
101x Processing device
101a Acquisition processing unit
101b, 101bx Mask unit
101c Identification unit
102 External storage unit
103 Light source unit
104 Modulation unit
105 Detection unit
106 External output unit
107 Output I/F
107x Output unit
109 Synchronous control unit
111 Mask control unit
191 Monitoring implementer
200, 201, 202 Optical fiber
211 Optical coupler
300 DAS system
400 Approval and authorization institution
410 Public issuance institution
420 Monitoring permission application
430 Mask setting file issuance request
440 Mask setting file
441 Time information
442 State notice
443 Valid period update notice
500 Monitoring server
801, 802 Backscattered light
901 RAW data
902 Summary data
903 Event data

What is claimed is:

1. A processing device included inside a transmission/reception device to be used for optical fiber sensing by an optical fiber, the processing device comprising:
   a mask circuit configured to mask a predetermined range in acquisition data, which is data acquired by the transmission/reception device through the optical fiber sensing; and
   an output circuit configured to output, to an outside of the transmission/reception device, post-masking data, which is the data on which the masking has been performed,
   wherein the acquisition data, before the masking regarding the predetermined range is performed, are not output to the outside,
   wherein one or more pieces of first combination information, an activation condition, and a kind of a mask processing are settable,
   wherein the one or more pieces of first combination information is information representing a combination of a target range,
   wherein the target range is a range of the acquisition data on which mask processing is performed,
   wherein the mask processing is processing for the masking performed by the mask circuit,
   wherein the activation condition is a condition for performing the mask processing regarding the predetermined target range, and
   wherein the kind of the mask processing is blurring, which includes performing, regarding the acquisition data in the target range, derivation of a moving average, regarding a time direction and a position direction, of the acquisition data in a predetermined temporal range and a positional range.

2. The processing device according to claim 1, wherein the first combination information is changeable.

3. The processing device according to claim 1, wherein the activation condition is constant or is a specification period being a specified period.

4. The processing device according to claim 3, wherein
   the specification period is based on information resulting from a factor of the outside.

5. The processing device according to claim 1, wherein the activation condition is specified by a kind of event detected from the acquisition data.

6. The processing device according to claim 1, wherein
   the target range is specified by at least one of a position range on a cable including the optical fiber and a frequency range.

7. The processing device according to claim 6, wherein the position range is identified by a start position and an end position.

8. The processing device according to claim 1, wherein
   the target range is set in association with a position, of an event detected from the acquisition data, on a cable including the optical fiber.

9. A processing device included inside a transmission/reception device to be used for optical fiber sensing by an optical fiber, the processing device comprising:
   a mask circuit configured to mask a predetermined range in acquisition data, which is data acquired by the transmission/reception device through the optical fiber sensing; and an output circuit configured to output, to an outside of the transmission/reception device, post-masking data, which is the data on which the masking has been performed, wherein the acquisition data, before the masking regarding the predetermined range is performed, are not output to the outside, wherein one or more pieces of first combination information, an activation condition, and a kind of a mask processing are settable, wherein the one or more pieces of first combination information is information representing a combination of a target range, wherein the target range is a range of the acquisition data on which mask processing is performed, wherein the mask processing is processing for the masking performed by the mask circuit, wherein the activation condition is a condition for performing the mask processing regarding the predetermined target range, and wherein the kind of the mask processing is mosaicization, which includes uniformly substituting each piece of the acquisition data in a predetermined temporal range and a positional range constituting the acquisition data in the positional target range, with a representative value of the acquisition data in the range.

10. The processing device according to claim 9, wherein the representative value is an average value.

11. The processing device according to claim 9, wherein the first combination information is changeable.

12. The processing device according to claim 9, wherein the activation condition is constant or is a specification period being a specified period.

13. The processing device according to claim 12, wherein the specification period is based on information resulting from a factor of the outside.

14. The processing device according to claim 9, wherein the activation condition is specified by a kind of event detected from the acquisition data.

15. The processing device according to claim 9, wherein the target range is specified by at least one of a position range on a cable including the optical fiber and a frequency range.

16. The processing device according to claim 15, wherein the position range is identified by a start position and an end position.

17. The processing device according to claim 9, wherein the target range is set in association with a position, of an event detected from the acquisition data, on a cable including the optical fiber.

18. A processing method being performed within a transmission/reception device to be used for optical fiber sensing by an optical fiber, the processing method comprising:

masking a predetermined range in acquisition data, which is data acquired by the transmission/reception device through the optical fiber sensing; and outputting, to an outside of the transmission/reception device, post-masking data, which is the data on which the masking has been performed, wherein the acquisition data, before the masking regarding the predetermined range is performed, are not output to the outside, wherein one or more pieces of first combination information, an activation condition, and a kind of a mask processing are settable, wherein the one or more pieces of first combination information is information representing a combination of a target range, wherein the target range is a range of the acquisition data on which mask processing is performed, wherein the mask processing is processing for the masking, wherein the activation condition is a condition for performing the mask processing regarding the predetermined target range, and wherein the kind of the mask processing is blurring, which includes performing, regarding the acquisition data in the target range, derivation of a moving average, regarding a time direction and a position direction, of the acquisition data in a predetermined temporal range and a positional range.

* * * * *